(12) United States Patent
Nammi et al.

(10) Patent No.: US 10,601,480 B2
(45) Date of Patent: *Mar. 24, 2020

(54) SYSTEMS AND METHODS FOR ADAPTIVELY RESTRICTING CSI REPORTING IN MULTI ANTENNA WIRELESS COMMUNICATIONS SYSTEMS UTILIZING UNUSED BIT RESOURCES

(71) Applicant: Telefonaktiebolaget LM Ericsson (publ), Stockholm (SE)

(72) Inventors: Sairamesh Nammi, Austin, TX (US); Bo Göransson, Sollentuna (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 59 days.

This patent is subject to a terminal disclaimer.

(21) Appl. No.: 15/314,454

(22) PCT Filed: Jun. 10, 2014

(86) PCT No.: PCT/SE2014/050691
§ 371 (c)(1),
(2) Date: Nov. 28, 2016

(87) PCT Pub. No.: WO2015/190956
PCT Pub. Date: Dec. 17, 2015

(65) Prior Publication Data
US 2017/0195029 A1    Jul. 6, 2017

(51) Int. Cl.
*H04B 7/06* (2006.01)
*H04L 25/03* (2006.01)
(Continued)

(52) U.S. Cl.
CPC ......... *H04B 7/0626* (2013.01); *H04B 7/0413* (2013.01); *H04B 7/0456* (2013.01);
(Continued)

(58) Field of Classification Search
CPC ... H04B 7/0626; H04B 7/0632; H04B 7/0413
See application file for complete search history.

(56) References Cited

U.S. PATENT DOCUMENTS 8,149,942 B1   4/2012   Wang et al.
8,699,589 B2 *  4/2014   Jia ..................... H04L 25/0204
                                                     375/260
(Continued)

FOREIGN PATENT DOCUMENTS

EP    2437408 A1   4/2012
EP    2683092 A1   1/2014
(Continued)

OTHER PUBLICATIONS

Non-Final Office Action for U.S. Appl. No. 14/526,722, dated Nov. 2, 2017, 19 pages.
(Continued)

*Primary Examiner* — Andrew Lai
*Assistant Examiner* — Chuong M Nguyen
(74) *Attorney, Agent, or Firm* — Withrow & Terranova, PLLC

(57) ABSTRACT

Systems and methods are disclosed for utilizing unused bit resources to convey restrictions on parameters evaluated for a feedback report in a Multiple-Input Multiple-Output (MIMO) wireless communication system. In one embodiment, a method of operation of a transmitting node in a wireless network includes transmitting a feedback restriction indicator to a receiving node, where the feedback restriction indicator is an unused bit resource in one or more instances of a control channel that is indicative of one or more desired restrictions on parameters to be evaluated by the receiving node for a feedback report to be provided from the receiving node. The method of operation of the transmitting node further includes receiving the feedback report
(Continued)

from the receiving node, where the feedback report is limited according to the feedback restriction indicator.

26 Claims, 16 Drawing Sheets

(51) Int. Cl.
*H04B 7/0456* (2017.01)
*H04B 7/0413* (2017.01)

(52) U.S. Cl.
CPC ......... *H04B 7/0486* (2013.01); *H04B 7/0632* (2013.01); *H04B 7/0643* (2013.01); *H04L 25/03898* (2013.01); *H04L 25/03955* (2013.01)

(56) References Cited

U.S. PATENT DOCUMENTS

| | | | |
|---|---|---|---|
| 9,136,924 B2* | 9/2015 | Park | H04B 7/0413 |
| 9,602,181 B2* | 3/2017 | Nammi | H04B 7/0413 |
| 2009/0213945 A1 | 8/2009 | Cairns et al. | |
| 2010/0172256 A1 | 7/2010 | Mallik et al. | |
| 2010/0232525 A1 | 9/2010 | Xia et al. | |
| 2010/0238913 A1 | 9/2010 | Xia et al. | |
| 2011/0040558 A1 | 2/2011 | Ehara | |
| 2011/0105164 A1 | 5/2011 | Lim et al. | |
| 2011/0116563 A1* | 5/2011 | Vitthaladevuni | H04L 1/0001 375/260 |
| 2011/0161675 A1 | 6/2011 | Diard | |
| 2011/0250926 A1 | 10/2011 | Wietfeldt et al. | |
| 2011/0261675 A1 | 10/2011 | Lee et al. | |
| 2012/0002750 A1 | 1/2012 | Hooli et al. | |
| 2012/0082248 A1* | 4/2012 | Han | H04B 7/0413 375/259 |
| 2013/0003812 A1 | 1/2013 | Collotta et al. | |
| 2013/0044650 A1 | 2/2013 | Barker et al. | |
| 2013/0148611 A1* | 6/2013 | Moulsley | H04B 7/024 370/329 |
| 2013/0155968 A1* | 6/2013 | Pelletier | H04L 5/0023 370/329 |
| 2013/0223245 A1 | 8/2013 | Taoka et al. | |
| 2014/0016549 A1* | 1/2014 | Novlan | H04B 7/0417 370/328 |
| 2014/0072065 A1 | 3/2014 | Nammi | |
| 2014/0169493 A1* | 6/2014 | Hammarwall | H04B 7/0634 375/267 |
| 2014/0205031 A1 | 7/2014 | Nammi | |
| 2015/0288435 A1 | 10/2015 | Nammi | |
| 2016/0127018 A1 | 5/2016 | Nammi et al. | |

FOREIGN PATENT DOCUMENTS

| | | |
|---|---|---|
| WO | 2010102583 A1 | 9/2010 |
| WO | 2011159963 A1 | 12/2011 |
| WO | 2013023291 A1 | 2/2013 |
| WO | 2014027949 A2 | 2/2014 |
| WO | 2014040771 A1 | 3/2014 |

OTHER PUBLICATIONS

Advisory Action for U.S. Appl. No. 14/526,722, dated Sep. 8, 2017, 3 pages.
Non-Final Office Action for U.S. Appl. No. 14/526,722, dated Dec. 14, 2016, 16 pages.
Author Unknown, "Technical Specification Group Radio Access Network; Multiplexing and channel coding (FDD) (Release 11)," Technical Specification 25.212, Version 11.7.0, 3GPP Organizational Partners, Mar. 2014, 162 pages.
Author Unknown, "Technical Specification Group Radio Access Network; Evolved Universal Terrestrial Radio Access (E-UTRA); User Equipment (UE) radio transmission and reception (Release 8)," Technical Specification 36.101, Version 8.0.0, 3GPP Organizational Partners, Dec. 2007, 45 pages.
Author Unknown,"Technical Specification Group Radio Access Network; Evolved Universal Terrestrial Radio Access (E-UTRA); Physical channels and modulation (Release 8)," Technical Specification 36.211, Version 8.0.0, 3GPP Organizational Partners, Sep. 2007, 50 pages.
Author Uknown, "Technical Specification Group Radio Access Network; Evolved Universal Terrestrial Radio Access (E-UTRA); Physical layer procedures (Release 10)," Technical Specification 36.213, Version 10.0.0, 3GPP Organizational Partners, Dec. 2010, 98 pages.
Ericsson, "R1-124503: Codebook Subset Restriction in Four Branch MIMO System," 3rd Generation Partnership Project (3GPP), TSG-RAN WG1 #70bis, Oct. 8-12, 2012, 5 pages, San Diego, USA.
Yang, Hyun Jong et al., "Codebook-Based Lattice-Reduction-Aided Preceding for Limited-Feedback Coded MIMO Systems," IEEE Transactions on Communications, vol. 60, No. 2, Feb. 2012, IEEE, pp. 510-524.
International Search Report for International Patent Application No. PCT/SE2014/050691, dated Jan. 23, 2015, 4 pages.
Non-Final Office Action for U.S. Appl. No. 14/526,722, dated Jun. 18, 2015, 21 pages.
Final Office Action for U.S. Appl. No. 14/526,722, dated Oct. 7, 2015, 26 pages.
Non-Final Office Action for U.S. Appl. No. 14/526,722, dated Mar. 16, 2016, 30 pages.
Final Office Action for U.S. Appl. No. 14/526,722, dated Aug. 26, 2016, 33 pages.
International Search Report and Written Opinion for International Patent Application No. PCT/EP2015/074796, dated Jan. 7, 2016, 14 pages.
Final Office Action for U.S. Appl. No. 14/526,722, dated Apr. 23, 2018, 22 pages.
Notice of Allowance for U.S. Appl. No. 14/526,722, dated Jul. 31, 2019, 10 pages.
Final Office Action for U.S. Appl. No. 14/526,722, dated May 3, 2017, 21 pages.

* cited by examiner

| BIT PATTERN | MODULATION FOR PRIMARY TRANSPORT BLOCK | MODULATION FOR SECOND TRANSPORT BLOCK | MODULATION FOR THIRD TRANSPORT BLOCK | MODULATION FOR FOURTH TRANSPORT BLOCK | NUMBER OF TRANSPORT BLOCKS |
|---|---|---|---|---|---|
| 00000 | QPSK | UNUSED | UNUSED | UNUSED | 1 |
| 00001 | 16QAM | UNUSED | UNUSED | UNUSED | 1 |
| 00010 | 64QAM | UNUSED | UNUSED | UNUSED | 1 |
| 00011 | QPSK | QPSK | UNUSED | UNUSED | 2 |
| 00100 | QPSK | 16QAM | UNUSED | UNUSED | 2 |
| 00101 | QPSK | 64QAM | UNUSED | UNUSED | 2 |
| 00110 | 16QAM | QPSK | UNUSED | UNUSED | 2 |
| 00111 | 16QAM | 16QAM | UNUSED | UNUSED | 2 |
| 01000 | 16QAM | 64QAM | UNUSED | UNUSED | 2 |
| 01001 | 64QAM | QPSK | UNUSED | UNUSED | 2 |
| 01010 | 64QAM | 16QAM | UNUSED | UNUSED | 2 |
| 01011 | 64QAM | 64QAM | UNUSED | UNUSED | 2 |
| 01100 | QPSK | QPSK | QPSK | UNUSED | 3 |
| 01101 | QPSK | 16QAM | 16QAM | UNUSED | 3 |
| 01110 | QPSK | 64QAM | 64QAM | UNUSED | 3 |
| 01111 | 16QAM | QPSK | QPSK | UNUSED | 3 |
| 10000 | 16QAM | 16QAM | 16QAM | UNUSED | 3 |
| 10001 | 16QAM | 64QAM | 64QAM | UNUSED | 3 |
| 10010 | 64QAM | QPSK | QPSK | UNUSED | 3 |
| 10011 | 64QAM | 16QAM | 16QAM | UNUSED | 3 |
| 10100 | 64QAM | 64QAM | 64QAM | UNUSED | 3 |
| 10101 | QPSK | QPSK | QPSK | QPSK | 4 |
| 10110 | QPSK | 16QAM | 16QAM | QPSK | 4 |
| 10111 | QPSK | 64QAM | 64QAM | QPSK | 4 |
| 11000 | 16QAM | QPSK | QPSK | 16QAM | 4 |
| 11001 | 16QAM | 16QAM | 16QAM | 16QAM | 4 |
| 11010 | 16QAM | 64QAM | 64QAM | 16QAM | 4 |
| 11011 | 64QAM | QPSK | QPSK | 64QAM | 4 |
| 11100 | 64QAM | 16QAM | 16QAM | 64QAM | 4 |
| 11101 | 64QAM | 64QAM | 64QAM | 64QAM | 4 |
| 11110 | | | UNUSED (RESERVED) | | |
| 11111 | | | UNUSED (RESERVED) | | |

FIG. 6

| BIT PATTERN (1-CODE WORD PATTERN) | SUBSET OF RANKS FOR REPORTING |
|---|---|
| 11110 | SEARCH ONLY RANK 1 AND RANK 2 |
| 11111 | SEARCH ALL RANKS |

FIG. 9A

| BIT PATTERN (1-CODE WORD PATTERN) | SUBSET OF RANKS FOR REPORTING |
|---|---|
| 11110 | SEARCH ONLY RANK 1 AND RANK 2 |
| 11111 | SEARCH ONLY RANK 3 AND RANK 4 |

FIG. 9B

| BIT PATTERN (1-CODE WORD PATTERN) | SUBSET OF RANKS FOR REPORTING |
|---|---|
| 11110 | SEARCH ONLY RANK 1 AND RANK 2 |
| 11111 | SEARCH ANY RANK UP TO RANK 3 |

FIG. 9C

| 2-CODE WORD PATTERN | SUBSET OF RANKS FOR REPORTING |
|---|---|
| (W1, W1) | SEARCH ONLY RANK 1 |
| (W1, W2) | SEARCH ONLY UP TO RANK 2 |
| (W2, W1) | SEARCH ONLY UP TO RANK 3 |
| (W2, W2) | SEARCH ONLY ANY RANK, I.E., UP TO RANK 4 |
| WHERE: W1=11110; W2=11111 | |

FIG. 10A

| 2-CODE WORD PATTERN | SUBSET OF RANKS FOR REPORTING |
|---|---|
| (W1, W1) | SEARCH ONLY RANK 1 |
| (W1, W2) | SEARCH ONLY RANK 2 AND RANK 3 |
| (W2, W1) | SEARCH ONLY RANK 3 AND RANK 4 |
| (W2, W2) | SEARCH ONLY UP TO RANK 3 |
| WHERE: W1=11110; W2=11111 | |

FIG. 10B

| 2-CODE WORD PATTERN | SUBSET OF RANKS FOR REPORTING |
|---|---|
| (W1, W1) | SEARCH ONLY RANK 1 |
| (W1, W2) | SEARCH ONLY RANK 2 |
| (W2, W1) | SEARCH ONLY RANK 3 |
| (W2, W2) | SEARCH ONLY RANK 4 |
| WHERE: W1=11110; W2=11111 | |

FIG. 10C

SYSTEMS AND METHODS FOR ADAPTIVELY RESTRICTING CSI REPORTING IN MULTI ANTENNA WIRELESS COMMUNICATIONS SYSTEMS UTILIZING UNUSED BIT RESOURCES

This application is a 35 U.S.C. § 371 national phase filing of International Application No. PCT/SE2014/050691, filed Jun. 10, 2014, the disclosure of which is incorporated herein by reference in its entirety.

FIELD OF THE DISCLOSURE

The present disclosure relates to systems and methods for adaptively restricting Channel State Information (CSI) reporting in multi-antenna wireless communications systems.

BACKGROUND

Multiple-Input Multiple-Output (MIMO) is an advanced antenna technique utilized in wireless systems (e.g., cellular communications networks) to improve spectral efficiency and thereby boost overall system capacity. For MIMO, a commonly known notation of (M×N) is used to represent the MIMO configuration in terms the number of transmit antennas (M) and the number of receive antennas (N). The common MIMO configurations used or currently discussed for various technologies are: (2×1), (1×2), (2×2), (4×2), (8×2) and (8×4). The MIMO configurations represented by (2×1) and (1×2) are special cases of MIMO, and they correspond to transmit diversity and receive diversity, respectively.

Using multiple antennas at the transmitter and receiver can significantly increase the system capacity. Specifically, transmission of independent symbol streams in the same frequency bandwidth, which is commonly referred to as Spatial Multiplexing (SM), achieves a linear increase in data rates with the increased number of antennas. On the other hand, by using space-time codes at the transmitter, reliability of the detected symbols can be improved by exploiting the so called transmit diversity. Both the SM scheme and the transmit diversity scheme assume no channel knowledge at the transmitter. However, in practical wireless systems such as the 3rd Generation Partnership Project (3GPP) Long Term Evolution (LTE), High Speed Downlink Packet Access (HSDPA), and WiMAX wireless systems, channel knowledge can be made available at the transmitter via feedback from the receiver to the transmitter. The transmitter can utilize this channel information to improve the system performance with the aid of precoding. In addition to beam forming gain, the use of precoding avoids the problem of an ill-conditioned channel matrix.

In practice, complete Channel State Information (CSI) may be available for a wireless system using a Time Division Duplexing (TDD) scheme by exploiting channel reciprocity. However, for a wireless system using a Frequency Division Duplexing (FDD) scheme, complete CSI is more difficult to obtain. In a FDD wireless system, some kind of CSI knowledge may be available at the transmitter via feedback from the receiver. These wireless systems are referred to as limited feedback systems. There are many implementations of limited feedback systems such as, e.g., codebook based feedback and quantized channel feedback. 3GPP LTE, HSDPA, and WiMax recommend codebook based feedback for precoding. Examples of CSI are Channel Quality Indicator (CQI), Precoding Indicator (PCI) (which is also referred to as a Precoding Matrix Indicator (PMI)), and a Rank Indicator (RI). One type of CSI or a combination of different types of CSI are used by a network node (e.g., a base station such as, for instance, a Node B in a Universal Terrestrial Radio Access (UTRA) network or an evolved or enhanced Node B (eNB) in LTE) for one or more resource assignment related tasks such as, e.g., scheduling data transmissions to a User Equipment device (UE), rank adaptation of MIMO streams, precoder selection for MIMO streams, etc.

In codebook based precoding, a predefined codebook is defined both at the transmitter and at the receiver. The entries of the codebook, which are commonly referred to as precoding matrices, can be constructed using different methods, e.g., Grassmannian, Lloyd's algorithm, Discrete Fourier Transform (DFT) matrix, etc. Each precoder matrix is often chosen to match the characteristics of the N×M MIMO channel matrix H for a particular number of transmit antennas (M) and receive antennas (N), resulting in so-called channel dependent precoding, where $N \geq 1$ and $M \geq 1$. This channel dependent precoding is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

Issues with codebook based precoding in a closed-loop MIMO wireless system arises from the fact that the performance of the system generally improves with the cardinality (i.e., size) of the codebook. Specifically, at the receiver, the receiver must evaluate all possible precoding matrices for all possible ranks for a given MIMO configuration (M×N) and report a RI and a PCI for the best rank and precoding matrix to the transmitter every Transmit Time Interval (TTI) or every few TTIs. Evaluating all possible precoding matrices for all possible ranks is a computationally intensive process. For example, in four branch MIMO in LTE, the UE must search 64 precoding matrices (also referred to as precoding entities) for finding the best rank and precoding matrix. This search of the 64 precoding matrices increases power consumption, drains UE battery life, and consumes more memory and processing resources at the UE. Furthermore the network node serving the UE may not always use a full set of CSI (e.g., a full set of ranks and precoding matrices). In this case, if the UE reports CSI (e.g., a RI and a PCI) out of the full set of CSI (e.g., all possible ranks and precoding matrices), then the network node may need to spend more resources or perform additional processing to identity an appropriate CSI for scheduling the UE.

Systems and methods that address these issues are described in commonly owned and assigned Patent Cooperation Treaty (PCT) International Publication No. WO 2014/027949 A2, entitled IMPLEMENTING CODEBOOK SUBSET RESTRICTIONS IN WIRELESS COMMUNICATION SYSTEMS, which was published on Feb. 20, 2014. In particular, WO 2014/027949 A2 discloses, among other things, embodiments in which a transmitting node provides feedback restriction information to a receiving node, where the feedback restriction information may specify restrictions on a feedback report to be sent from the receiving node. In one particular embodiment, the feedback restriction information is provided by transmitting an unused bit pattern in the five bits corresponding to the modulation information in Part 1 of a High Speed Shared Control Channel (HS-SCCH) in a HSDPA system to indicate that there is a restriction for feedback purposes. The feedback restriction(s) are then transmitted using a bit map in at least some of the remaining bits of the HS-SCCH. In other words, transmission of the unused bit pattern is an indication that at least some of the remaining bits of the HS-SCCH are being repurposed for transmitting feedback restriction(s).

However, there still remains a need for additional schemes for addressing the issues described above for closed-loop MIMO systems utilizing codebook based precoding.

SUMMARY

Systems and methods are disclosed for utilizing unused bit resources to convey restrictions on parameters evaluated for a feedback report in a Multiple-Input Multiple-Output (MIMO) wireless communications system. In one embodiment, a method of operation of a transmitting node in a wireless network is provided. In one embodiment, the method of operation of the transmitting node includes transmitting a feedback restriction indicator to a receiving node, where the feedback restriction indicator is an unused bit resource in one or more instances of a control channel that is indicative of one or more desired restrictions on parameters to be evaluated by the receiving node for a feedback report to be provided from the receiving node. The unused bit resource is a bit resource in the one or more instances of the control channel that is not used to convey one or more transmission parameters that are to be applied by the transmitting node in transmitting data to the receiving node. The method of operation of the transmitting node further includes receiving the feedback report from the receiving node, where the feedback report is limited according to the feedback restriction indicator. Importantly, by conveying the one or more desired restrictions via the unused bit pattern, the one or more desired restrictions are provided to the receiving node in an efficient manner. Further, by using the unused bit patterns in the one or more instances of the control channel, the one or more desired restrictions may, in some embodiments, be dynamically configured.

In one embodiment, the method of operation of the transmitting node further includes transmitting transmission parameters to the receiving node based on the feedback report. The transmission parameters specify one or more transmission characteristics that are to be applied by the transmitting node in transmitting data to the receiving node.

In one embodiment, the unused bit resource is one of two or more unused bit resources each being indicative of one or more different restrictions on the parameters to be evaluated by the receiving node for the feedback report. Further, in one embodiment, the two or more unused bit resources are two or more unused bit patterns in the same field of one instance of the control channel each being indicative of one or more different restrictions on the parameters to be evaluated by the receiving node for the feedback report. In another embodiment, the control channel is a Type 4 High Speed Shared Control Channel (HS-SCCH), and the two or more unused bit resources include two unused bit patterns in a Modulation (MOD) field in Part 1 of the HS-SCCH in one instance of the HS-SCCH, where each of the two unused bit patterns is indicative of one or more different restrictions on the parameters to be evaluated by the receiving node for the feedback report.

In yet another embodiment, the two or more unused bit resources are two or more combinations of unused bit patterns in the same field of two or more instances of the control channel, where each of the two or more combinations of unused bit patterns is indicative of one or more different restrictions on the parameters to be evaluated by the receiving node for the feedback report. In another embodiment, the control channel is a Type 4 HS-SCCH, and the two or more unused bit resources include two or more combinations of two unused bit patterns in a MOD field in Part 1 of the HS-SCCH in two or more instances of the HS-SCCH, where each of the two or more combinations of two unused bit patterns in the two or more instances of the HS-SCCH is indicative of one or more different restrictions on the parameters to be evaluated by the receiving node for the feedback report.

In one embodiment, transmitting the feedback restriction indicator includes transmitting one of the two or more unused bit resources that is indicative of one or more desired restrictions on the parameters to be evaluated by the receiving node for the feedback report.

In one embodiment, for each unused bit resource of the two or more unused bit resources, the one or more different restrictions indicated by the unused bit resource restrict evaluation of the parameters by the receiving node for the feedback report to a subset of Channel State Information (CSI) parameters $C_{subset}$ from a defined set of CSI parameters $C_{set}$, where $C_{subset} \subseteq C_{set}$. Further, in one embodiment, the subset of CSI parameters $C_{subset}$ for at least one of the unused bit resources includes one or more but less than all CSI parameters in the defined set of CSI parameters $C_{set}$. In one embodiment, the defined set of CSI parameters $C_{set}$ includes two or more rank indicators, two or more precoding indices, and/or two or more Channel Quality Indicators (CQIs).

In one embodiment, the method of operation of the transmitting node further includes selecting one or more desired restrictions on the parameters to be evaluated by the receiving node for the feedback report based on one or more selection criteria. In this embodiment, transmitting the feedback restriction indicator includes transmitting one of the two or more unused bit patterns that corresponds to the one or more desired restrictions as the feedback restriction indicator. In one embodiment, the one or more selection criteria include received signal quality at the receiving node, a speed of the receiving node, statistics of usage of feedback reports by the transmitting node, statistics of feedback reports from the receiving node, traffic load, load at the receiving node due to parallel procedures, battery life at the receiving node, and/or power consumption at the receiving node. An example of parallel procedures in the receiving node is receiving data and performing radio measurements on one or more cells. Another example of parallel procedures in the receiving node is performing radio measurements on one or more cells on two or more carrier frequency frequencies.

In one embodiment, the unused bit resource is an unused bit in one instance of the control channel, an unused bit pattern in one instance of the control channel, or a combination of unused bit patterns in two or more instances of the control channel. In one embodiment, the control channel is a Type 4 HS-SCCH, and the unused bit resource is an unused bit pattern in a MOD field in Part 1 of the HS-SCCH.

In another embodiment, a transmitting node in a wireless network is provided. In one embodiment, the transmitting node includes a transceiver, a processor associated with the transceiver, and memory containing software executable by the processor whereby the transmitting node operates to transmit a feedback restriction indicator to a receiving node, where the feedback restriction indicator is an unused bit resource in one or more instances of a control channel that is indicative of one or more desired restrictions on parameters to be evaluated by the receiving node for a feedback report to be provided from the receiving node. The unused bit resource is a bit resource in the one or more instances of the control channel that is not used to convey one or more transmission parameters that are to be applied by the transmitting node in transmitting data to the receiving node. Via the execution of the software, the transmitting node further operates to receive the feedback report from the receiving node, the feedback report being limited according to the feedback restriction indicator.

In one embodiment, a method of operation of a receiving node in a wireless network is provided. In one embodiment, the method of operation of the receiving node includes receiving a feedback restriction indicator from a transmitting node, where the feedback restriction indicator is an unused bit resource in one or more instances of a control channel that is indicative of one or more desired restrictions on parameters to be evaluated by the receiving node for a feedback report to be provided to the transmitting node from the receiving node. The unused bit resource is a bit resource in the one or more instances of the control channel that is not used to convey one or more transmission parameters that are to be applied by the transmitting node in transmitting data to the receiving node. The method of operation of the receiving node further includes transmitting the feedback report based on the feedback restriction indicator to the transmitting node.

In one embodiment, the method of operation of the receiving node further includes, prior to transmitting the feedback report, generating the feedback report according to the feedback restriction indicator.

In one embodiment, the unused bit resource is one of two or more unused bit resources each being indicative of one or more different restrictions on the parameters to be evaluated by the receiving node for the feedback report. Further, in one embodiment, the two or more unused bit resources are two or more unused bit patterns in the same field of one instance of the control channel each being indicative of one or more different restrictions on the parameters to be evaluated by the receiving node for the feedback report. In another embodiment, the control channel is a Type 4 HS-SCCH, and the two or more unused bit resources include two unused bit patterns in a MOD field in Part 1 of the HS-SCCH in one instance of the HS-SCCH, where each of the two unused bit patterns is indicative of one or more different restrictions on the parameters to be evaluated by the receiving node for the feedback report.

In another embodiment, the two or more unused bit resources are two or more combinations of unused bit patterns in the same field of two or more instances of the control channel, where each of the two or more combinations of unused bit patterns is indicative of one or more different restrictions on the parameters to be evaluated by the receiving node for the feedback report. In another embodiment, the control channel is a Type 4 HS-SCCH, and the two or more unused bit resources include two or more combinations of two unused bit patterns in a MOD field in Part 1 of the HS-SCCH in two or more instances of the HS-SCCH, where each of the two or more combinations of two unused bit patterns in the two or more instances of the HS-SCCH is indicative of one or more different restrictions on the parameters to be evaluated by the receiving node for the feedback report.

In one embodiment, for each unused bit resource of the two or more unused bit resources, the one or more different restrictions indicated by the unused bit resource restrict evaluation of the parameters by the receiving node for the feedback report to a subset of CSI parameters $C_{subset}$ from a defined set of CSI parameters $C_{set}$, where $C_{subset} \subseteq C_{set}$. Further, in one embodiment, the subset of CSI parameters $C_{subset}$ for at least one of the unused bit resources includes one or more but less than all CSI parameters in the defined set of CSI parameters $C_{set}$. In one embodiment, the defined set of CSI parameters $C_{set}$ includes two or more rank indicators, two or more precoding indices, and/or two or more CQIs.

In one embodiment the method of operation of the receiving node further includes determining that unused bit resources are to be used for transmission of feedback restriction indicators. In this embodiment, receiving the feedback restriction indicator includes monitoring for transmission of the unused bit resource in response to determining that unused bit resources are to be used for transmission of feedback restriction indicators.

In one embodiment, the unused bit resource is an unused bit in one instance of the control channel, an unused bit pattern in one instance of the control channel, or a combination of unused bit patterns in two or more instances of the control channel. In one embodiment, the control channel is a Type 4 HS-SCCH, and the unused bit resource is an unused bit pattern in a MOD field in Part 1 of the HS-SCCH.

In one embodiment, a receiving node in a wireless network is provided. In one embodiment, the receiving node includes a transceiver, a processor associated with the transceiver, and memory containing software executable by the processor whereby the receiving node operates to receive a feedback restriction indicator from a transmitting node, where the feedback restriction indicator is an unused bit resource in one or more instances of a control channel that is indicative of one or more desired restrictions on parameters to be evaluated by the receiving node for a feedback report to be provided to the transmitting node from the receiving node. The unused bit resource being a bit resource in the one or more instances of the control channel that is not used to convey one or more transmission parameters that are to be applied by the transmitting node in transmitting data to the receiving node. In addition, via execution of the software, the receiving node further operates to transmit the feedback report based on the feedback restriction indicator to the transmitting node.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 6 illustrates a table of bit patterns utilized in Part 1 of the HS-SCCH for joint coding of the number of transport blocks transmitted on the associated HS-PDSCH(s) and the modulation and coding scheme information;

FIGS. 9A through 9C are tables that illustrate some example mappings of the unused bit patterns 11110 and 11111 in Type 4 HS-SCCH in High Speed Packet Access (HSPA) to feedback restrictions according to one embodiment of the present disclosure;

FIGS. 10A through 10C are tables that illustrate some example mappings of combinations of the unused bit patterns 11110 and 11111 in Type 4 HS-SCCH in HSPA to feedback restrictions for a 2-codeword embodiment of the present disclosure;

Figure 1:
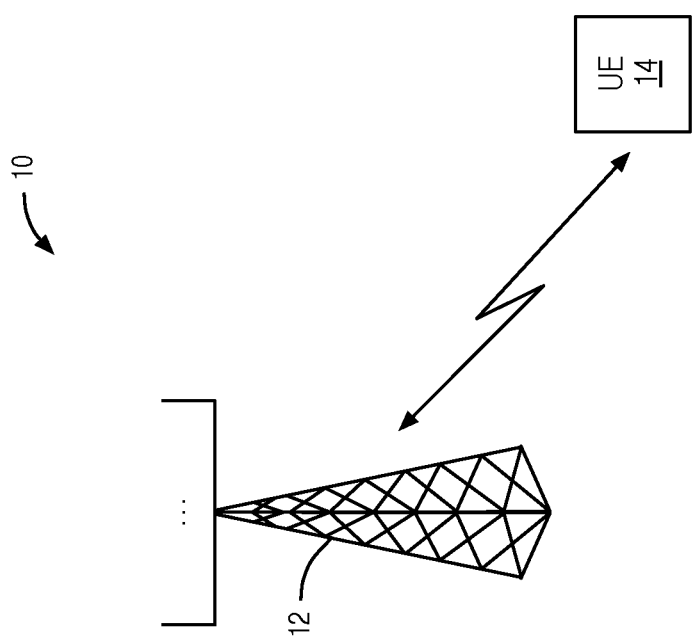
FIG. 1 illustrates one example of a closed-loop Multiple-Input Multiple-Output (MIMO) wireless communications system that utilizes codebook based precoding and in which unused bit resources are utilized as feedback restriction indicators that limit parameters evaluated for feedback reports according to one embodiment of the present disclosure.
Figure 13:
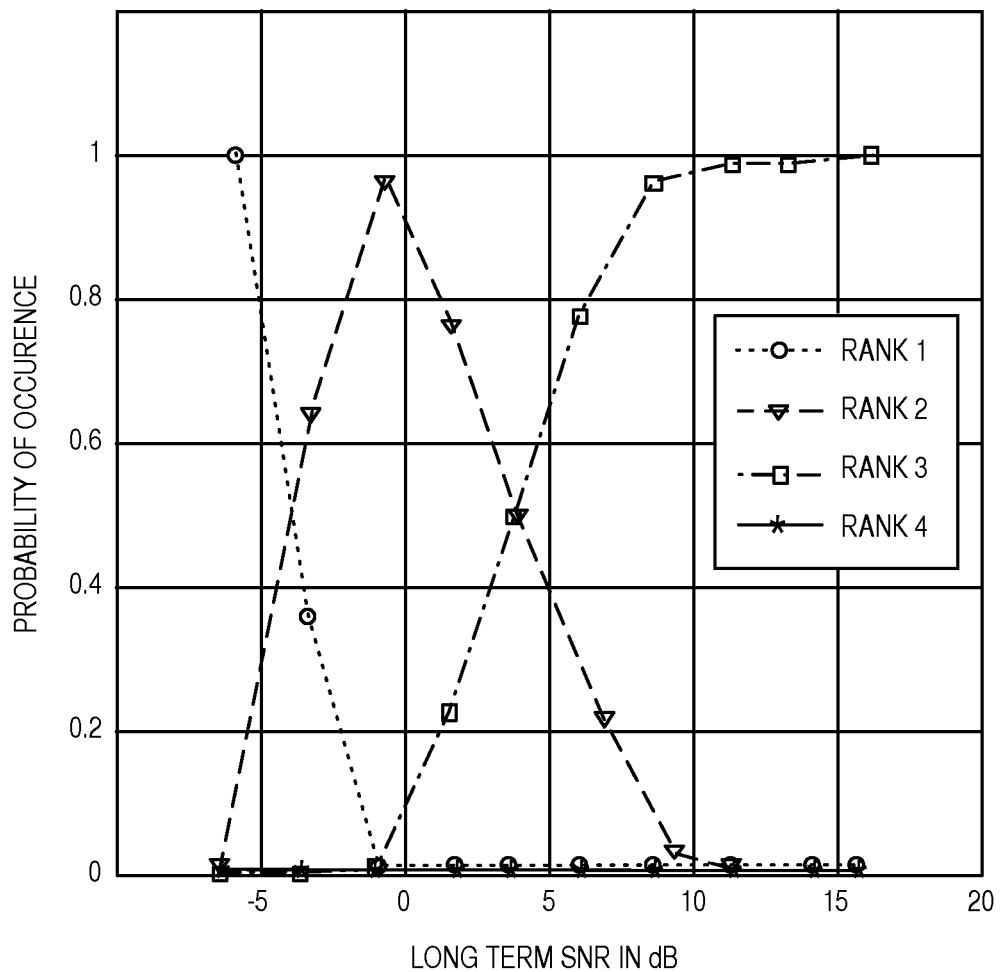
Figure 14:
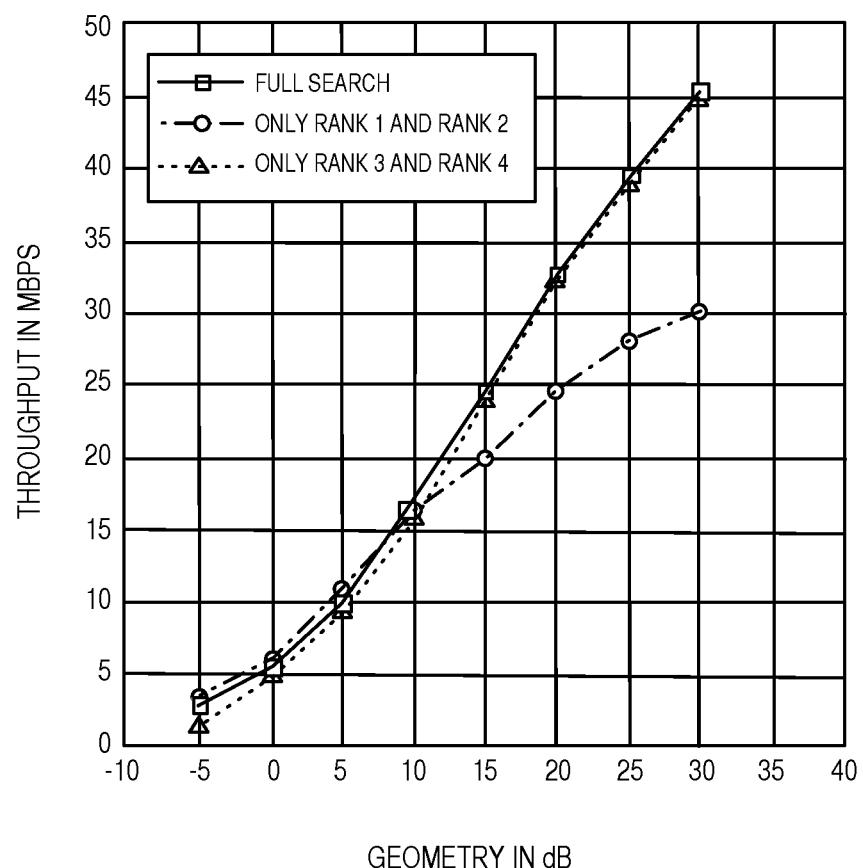
Figure 15:
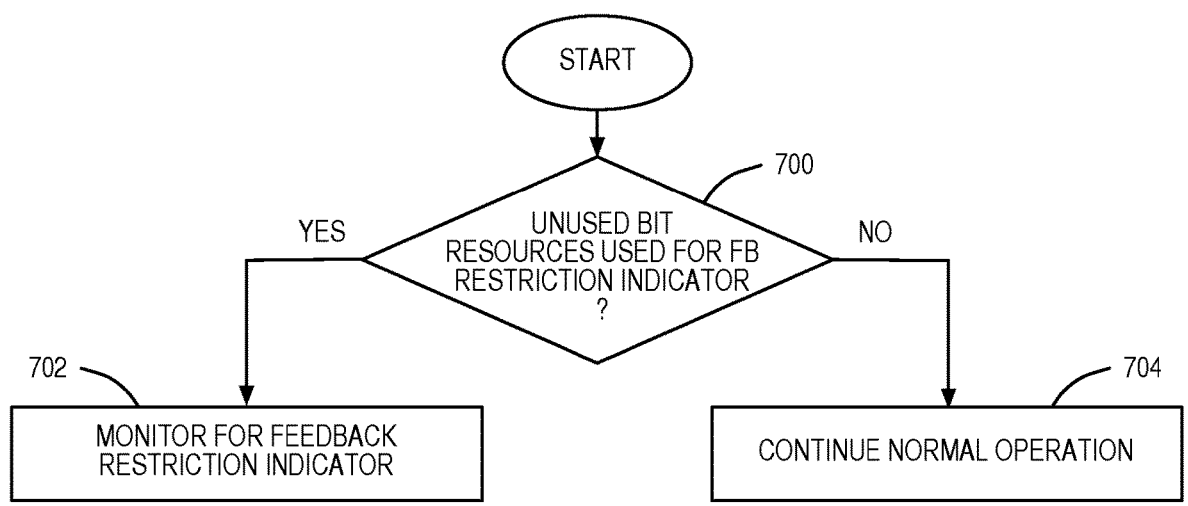
Figure 16:
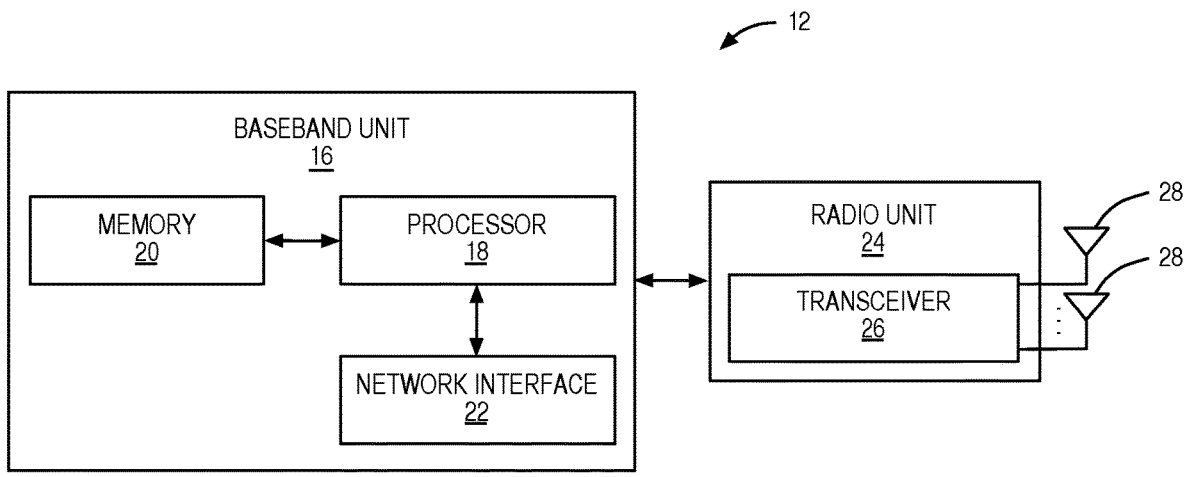
Figure 17:
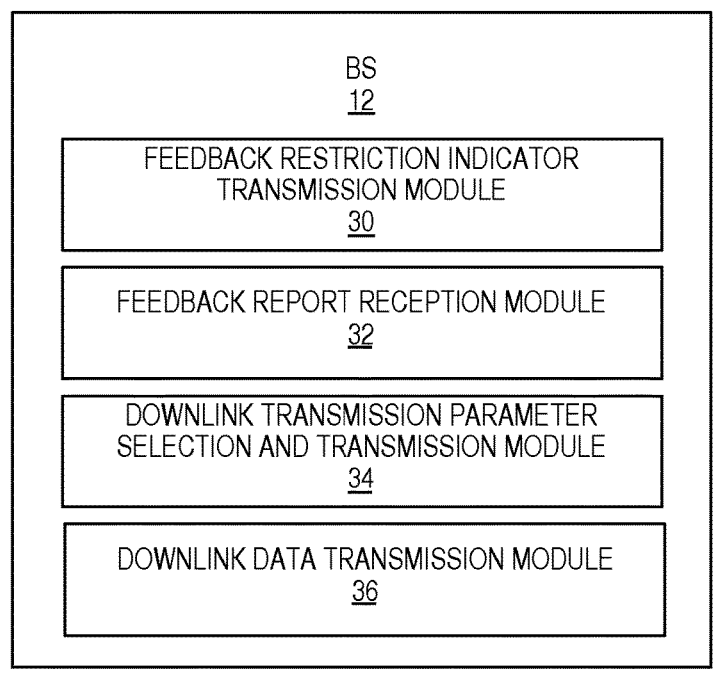
Figure 18:
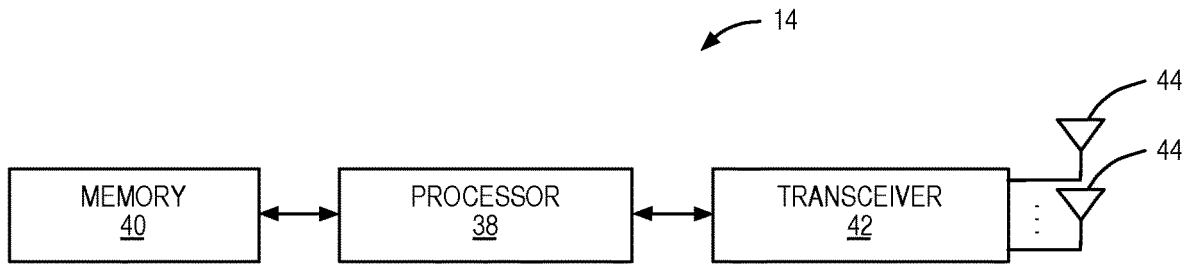
Figure 19:
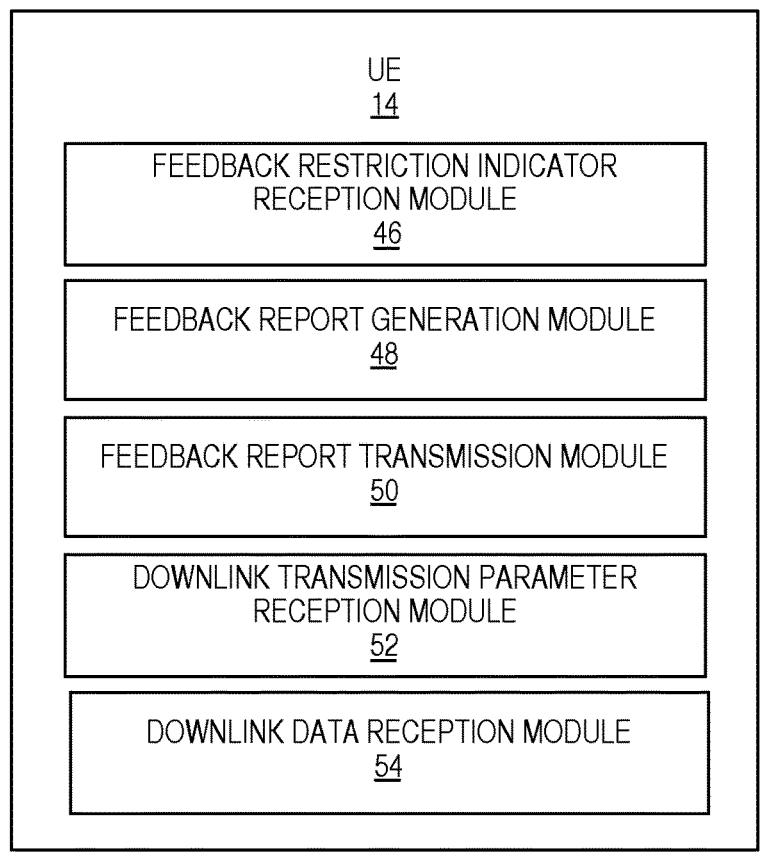

FIG. 13 graphically illustrates a simulated rank distribution as a function of long term Signal to Noise Ratio (SNR) (path loss/geometry) for one example of a four branch MIMO system;

FIG. 14 graphically illustrates simulation results for average link throughput with only subsets of ranks for one example implementation of one embodiment of the present disclosure;

FIG. 15 is a flow chart that illustrates a process by which the UE of FIG. 1 determines whether to monitor for a feedback restriction indicator according to one embodiment of the present disclosure;

FIG. 16 is a block diagram of the base station of FIG. 1 according to one embodiment of the present disclosure;

FIG. 17 is a functional block diagram of the base station of FIG. 1 according to one embodiment of the present disclosure;

FIG. 18 is a block diagram of the UE of FIG. 1 according to one embodiment of the present disclosure; and FIG. 19 is a functional block diagram of the UE of FIG. 1 according to one embodiment of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In the description below, the non-limiting term radio network node or simply network node is sometimes used and refers to any type of network node serving a User Equipment device (UE) and/or connected to other network node(s) or network element(s) or any radio node from where a UE receives a signal. Examples of radio network nodes are a Node B, a Base Station (BS), a Multi-Standard Radio (MSR) radio node such as a MSR BS, an enhanced or evolved Node B (eNB), a network controller, a Radio Network Controller (RNC), a Base Station Controller (BSC), a relay, a donor node controlling relay, a Base Transceiver Station (BTS), an Access Point (AP), a transmission point, a transmission node, a Remote Radio Unit (RRU), a Remote Radio Head (RRH), a node in a Distributed Antenna System (DAS), etc.

Further, in the description below, the non-limiting term UE is sometimes used and refers to any type of wireless device communicating with a radio network node in a wireless system, e.g., a cellular or mobile communications system. Examples of a UE include a target device, a Device-to-Device (D2D) UE, a machine-type UE or UE capable of Machine-to-Machine (M2M) communication, a Personal Digital Assistant (PDA), an iPad® device, a tablet computer, a mobile terminal, a smart phone, a Laptop Embedded Equipment (LEE), a Laptop Mounted Equipment (LME), a Universal Serial Bus (USB) dongle, etc.

Many of the embodiments described below are described with respect to closed-loop Multiple-Input Multiple-Output (MIMO) operation in Universal Terrestrial Radio Access (UTRA)/High Speed Packet Access (HSPA). However, the embodiments disclosed herein are applicable to any Radio Access Technology (RAT) or multi-RAT system where the UE operates using closed-loop MIMO such as, e.g., $3^{rd}$ Generation Partnership Project (3GPP) Long Term Evolution (LTE) Frequency Division Duplexing (FDD)/Time Division Duplexing (TDD), Global System for Mobile Communications (GSM)/GSM Enhanced Data Rates for GSM Evolution Radio Access Network (GERAN), Wi-Fi, Wireless Local Area Network (WLAN), WiMax, Code Division Multiple Access 2000 (CDMA2000), etc. Further, the embodiments described herein are applicable to single carrier as well as to MultiCarrier (MC) or Carrier Aggregation (CA) operation of the UE in conjunction with MIMO in which the UE is able to receive and/or transmit data to more than one serving cell using MIMO. The term CA is also called (e.g., interchangeably called) "multi-carrier system," "multi-cell operation," "multi-carrier operation," "multi-carrier" transmission and/or reception.

Systems and methods are disclosed for utilizing unused bit resources to convey restrictions on parameters evaluated for a feedback report in a closed-loop MIMO wireless communications system. As used herein, an "unused bit resource" is an unused bit, an unused bit pattern, a combination of unused bit patterns over multiple transmit instances (e.g., over multiple instances of a downlink control channel where each instance corresponds to the downlink control channel in a single Transmit Time Interval (TTI) or subframe), an unused field(s), an unused control space, or the like. Further, as used herein an "unused" bit resource is a bit resource (e.g., a bit or a bit pattern) that is not normally used to convey information according to a corresponding wireless communication standard. For instance, an "unused" bit resource may be a bit or a bit pattern that is defined by a corresponding wireless communication standard as being "unused," "reserved," or "spared." Further, in some embodiments, an "unused" bit resource is a redundant bit resource such as, e.g., a redundant bit(s), redundant bit patterns, redundant codeword(s), redundant control space, or the like. An one example, the unused bit resources may be bits or bit patterns in a downlink control channel or specific format/type of a downlink control channel associated with a certain feature (e.g., 4×4 MIMO) that are not currently used for any purpose (e.g., as defined by a corresponding standard) and, in some embodiments, not used for conveying any downlink transmission parameters (e.g., downlink modulation, precoding index, and/or number of transport blocks) to a UE. As a specific example, for Type 4 for High Speed Shared Control Channel (HS-SCCH) in HSPA, the unused bit resources are, in some embodiments, unused bit patterns in a particular field of the HS-SCCH.

FIG. 1 illustrates one example of a closed-loop MIMO wireless communications system that utilizes codebook based precoding and in which unused bit resources are utilized as feedback restriction indicators that limit parameters evaluated for feedback reports according to one embodiment of the present disclosure. In this example, the MIMO wireless communications system is a cellular network 10 including a base station 12 and a UE 14. In many of the embodiments below, the base station 12 is part of a Universal Mobile Telecommunications System (UMTS) and, in particular, part of the UMTS Universal Terrestrial Radio Access Network (UTRAN), and the downlink from the base station 12 to the UE 14 is provided according to the High Speed Downlink Packet Access (HSDPA) standards. However, as noted above, the present disclosure is not limited thereto. Rather, concepts disclosed herein are applicable to any MIMO wireless communications system utilizing a closed-loop codebook based precoding scheme.

The base station 12 is equipped with multiple antennas. Likewise, in this example, the UE 14 is also equipped with multiple antennas, but may in other embodiments include only a single antenna. In at least some modes of operation, the base station 12 utilizes a closed-loop MIMO scheme to transmit one or more transmission layers to the UE 14 via two or more antennas. The transmission layers are referred to as ranks (i.e., a rank of 1 refers to 1 transmission layer, a rank of 2 refers to 2 transmission layers, etc.). Further, a number of transmit antennas (M) at the base station 12 utilized for MIMO transmission to the UE 14 and a number of receive antennas (N) at the UE 14 utilized to receive the MIMO transmission from the base station 12 define a MIMO configuration (M×N).

In operation, a MIMO scheme using a closed-loop codebook based precoding is utilized for transmissions from the base station 12 to the UE 14. When using closed-loop codebook based precoding, the base station 12 selects a rank and precoding matrix to be used for downlink data transmissions to the UE 14 based on a feedback report from the UE 14. The feedback report includes Channel State Information (CSI) including a Rank Indicator (RI) and a Precoding Indicator (PCI) (which may also be referred to herein as a Precoding Matrix Indicator (PMI)) that identify a preferred, or best, rank and precoding matrix selected by the UE 14. Based on the feedback report, the base station 12 selects one or more transmission parameters for downlink data transmission to the UE 14. The base station 12 sends the transmission parameters to the UE 14 and then transmits downlink data to the UE 14 using those transmission parameters.

Using conventional closed-loop codebook based precoding schemes, the UE 14 must evaluate all precoding matrices for all ranks for a particular MIMO configuration. This evaluation of the precoding matrices is typically based on measurements (e.g., signal quality measurements such as Signal to Interference Plus Noise Ratio (SINR)) made at the UE 14. As such, particularly as the cardinality of the codebooks for the different ranks increases, the resources required for this evaluation become increasingly significant. Further, in some cases, the base station 12 may not use all precoding matrices for all ranks. However, when using conventional closed-loop codebook based precoding schemes, the UE 14 must still evaluate all precoding matrices for all ranks, even if some of the ranks and corresponding precoding matrices are not used by the base station 12. Further, the rank and precoding matrix selected by the UE 14 and reported to the base station 12 may, in some cases, be a rank and precoding matrix not used by the base station 12, which leads to additional complexity at the base station 12 in selecting an appropriate rank and precoding matrix for the UE 14.

For example, in the 3GPP LTE standard, separate codebooks are defined for various combinations of the number of transmit antennas and the number of transmission layers/ranks. For instance, for 4 transmit antennas, a total of 64 precoding matrices are defined. Note that, in some MIMO configurations, the precoding matrices are actually vectors; however, the term precoding matrices is used herein to refer to both true precoding matrices as well as precoding vectors for convenience. Also, for each rank (i.e., RI=1, 2, 3, and 4), the codebook for the rank includes 16 precoding matrices to give the total of 64 precoding matrices. Thus, when generating the feedback report for closed-loop codebook based precoding, conventionally, the UE must evaluate all 64 precoding matrices (i.e., all 16 precoding matrices for all 4 ranks). The 3GPP standard does not specify what criteria the UE should use to select the optimum, or best, rank and precoding matrix. Thus, using some desired criteria (e.g., SINR), the UE selects the best rank and precoding matrix from the total of 4 ranks and 16 precoding matrices per rank. The UE then sends a feedback report including a RI and a PCI for the selected rank and precoding matrix. Based on the feedback report, a scheduler of the eNB then decides transmission parameters for downlink data transmission to the UE (e.g., modulation and code rate (Transport Block Size (TBS)), PMI, rank information, etc.) on the Physical Downlink Shared Channel (PDSCH). The transmission parameters are sent to the UE through the Physical Downlink Control Channel (PDCCH). After transmitting the PDCCH, the data channel (i.e., the PDSCH) is also transmitted to the UE. In LTE the UE may send the CSI feedback report related to PDSCH on any of the uplink control or data channels (i.e., the Physical Uplink Control Channel (PUCCH) and the Physical Uplink Shared Channel (PUSCH)).

In order to address the issues discussed above, the base station 12 transmits a feedback restriction indicator to the UE 14 that restricts, or limits, parameters that are to be evaluated by the UE 14 when generating the feedback report. As discussed below, the feedback restriction indicator is an unused bit pattern that is mapped to or otherwise indicative of a desired feedback restriction(s). More specifically, the feedback restriction(s) indicated by the feedback restriction indicator limit the parameters to be evaluated by the UE 14 when generating the feedback report to a subset of CSI parameters ($C_{subset}$) from a defined set of CSI parameters ($C_{set}$), where $C_{subset} \subseteq C_{set}$. The defined set of CSI parameters ($C_{set}$) is a defined set of one or more types of parameters (e.g., a defined set of ranks, where rank is one type of CSI parameter. Further, different unused bit resources are mapped to, or otherwise indicative of, different feedback restrictions. So, for example, a first unused bit resource may be mapped to a first subset of CSI parameters ($C_{subset,1}$) from the defined set of CSI parameters ($C_{set}$), where $C_{subset,1} \subseteq C_{set}$, a second unused bit resource may be mapped to a second subset of CSI parameters ($C_{subset,2}$) from the defined set of CSI parameters ($C_{set}$), where $C_{subset,2} \subseteq C_{set}$ and $C_{subset,1} \neq C_{subset,2}$. Thus, by transmitting an appropriate unused bit pattern, the base station 12 provides a feedback restriction indictor to the UE 14 that is indicative of a desired feedback restriction.

While the feedback restrictions may be for any type of CSI parameters, in one embodiment, the feedback restrictions are for ranks. For example, a first unused bit resource may be mapped to, or otherwise indicative of, a restriction to rank 1 and rank 2, and a second unused bit resource may be mapped to, or otherwise indicative of, a restriction to rank 3 and rank 4. In this manner, by transmitting the first unused bit resource, the base station 12 provides a feedback restriction indicator to the UE 14 that indicates that the UE 14 is to evaluate the precoding matrices for only rank 1 and rank 2 when generating the feedback report. Conversely, by transmitting the second unused bit resource, the base station 12 provides a feedback restriction indicator to the UE 14 that indicates that the UE 14 is to evaluate the precoding matrices for only rank 3 and rank 4 when generating the feedback report. Again, while rank is used in the examples above, the present disclosure is not limited thereto. Any CSI parameters may be restricted.

Figure 2:
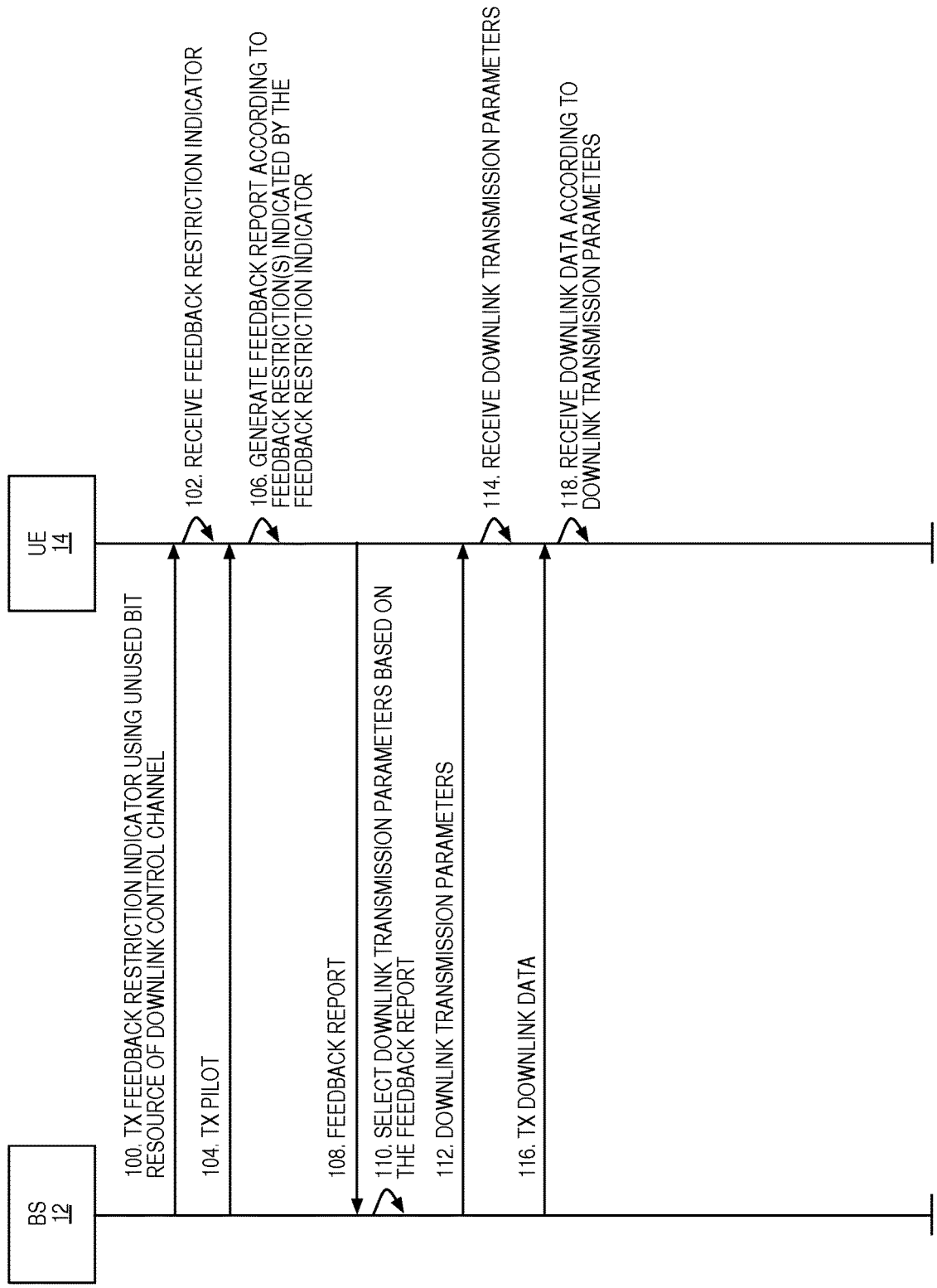
FIG. 2 illustrates the operation of the base station and the User Equipment device (UE) of FIG. 1 according to one embodiment of the present disclosure.

FIG. 2 illustrates the operation of the base station 12 and the UE 14 of FIG. 1 according to one embodiment of the present disclosure. Note that, in this example, the base station 12 is the transmitting node and the UE 14 is the receiving node. However, similar operation may be provided for MIMO transmissions from the UE 14 to the base station 12 or between any transmitting node and receiving node in a wireless system utilizing a closed-loop MIMO scheme. As illustrated, the base station 12 transmits a feedback restriction indicator to the UE 14 using an unused bit resource in a downlink control channel (step 100). In particular, the base station 12 transmits the unused bit resource as the feedback restriction indicator. This unused bit resource is mapped to, or otherwise indicative of, a restriction on the parameters to be evaluated by the UE 14 when generating a feedback report to be provided to the base station 12. For example, as discussed above, the unused bit resource may be indicative of a restriction on the ranks (and thus the corresponding precoding matrices) to be evaluated by the UE 14. Again, the unused bit resource may be an unused bit(s), an unused bit pattern in a single instance of the downlink control channel, or a combination of unused bit patterns in multiple instances of the downlink control channel.

The UE 14 receives the feedback restriction indicator (step 102). In one embodiment, a mapping between a set of all possible feedback restriction indicators (e.g., all unused bit resources) and corresponding feedback restrictions is stored by the UE 14. In another embodiment, this mapping is defined by a corresponding standard. Further, in some embodiments, the UE 14 determines whether to monitor for the feedback restriction indicator based on, e.g., one or more predefined rules and/or pre-configurations from the cellular network 10.

The base station 12 also transmits a pilot, or reference signal (step 104). Based on the reference signal, the UE 14 generates the feedback report according to the feedback restriction(s) indicated by the feedback restriction indicator (step 106). In one embodiment, the feedback restriction indicator is indicative of a subset of ranks for which the corresponding precoding matrices are to be evaluated. The UE 14 estimates a channel between the transmitter of the base station 12 and the receiver of the UE 14 (e.g., computes the channel coefficients). For each precoding matrix associated with a rank that is in the subset of ranks indicated by the feedback restriction indicator, the UE 14 generates a measurement of the downlink channel quality (e.g., Signal to Noise Ratio (SNR), SINR, etc.) for that precoding matrix. Based on the measurements of downlink channel quality, the UE 14 computes a capacity of the downlink channel for each precoding matrix associated with a rank in the subset of ranks indicated by the feedback restriction indicator. The UE 14 then selects the precoding matrix providing the best capacity and the corresponding rank as the optimum or best rank and precoding matrix for the UE 14. The RI and PCI for the selected rank and precoding matrix are then included in the feedback report.

Once generated, the UE 14 transmits the feedback report to the base station 12 (step 108). Based on the feedback report, and in particular the CSI in the feedback report, the base station 12 selects one or more transmission parameters to be used for downlink data transmissions to the UE 14 (step 110). The transmission parameters may be, e.g., modulation and code rate (TBS), PMI, rank information, etc. The base station 12 transmits, and the UE 14 receives, the selected transmission parameter(s) (steps 112 and 114). The base station 12 transmits downlink data to the UE 14 (step 116), and the UE 14 receives the downlink data according to the received transmission parameters (step 118).

Figure 3:
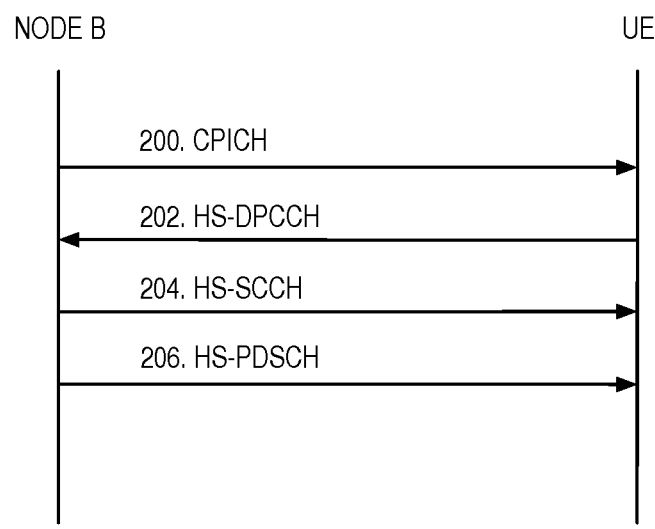
FIG. 3 illustrates a conventional message exchange between a Node B and a UE during a typical data call set up in a High Speed Downlink Packet Access (HSDPA) wireless system.

Before describing specific embodiments of the present disclosure, a brief overview of closed-loop MIMO in HSPA is beneficial. In this regard, FIG. 3 illustrates a conventional message exchange between a Node B and a UE during typical data call set up in HSDPA. First, the Node B transmits a Common Pilot Channel (CPICH) (step 200). From the CPICH, the UE estimates the channel and computes the channel quality information and precoding channel indicator. This information along with Hybrid Automatic Repeat Request (HARQ) Acknowledgment (ACK)/Negative Acknowledgement (NACK) is reported to the Node B using a dedicated High Speed Dedicated Physical Control Channel (HS-DPCCH) (step 202). The minimum periodicity of the HS-DPCCH is one subframe (i.e., 2 milliseconds (ms)). A scheduler of the Node B decides transmission parameters for downlink data transmission to the UE (e.g., modulation and code rate (TBS), PCI, RI for the data transmission (High Speed Physical Downlink Shared Channel (HS-PDSCH)), etc.) based on the information provided in the HS-DPCCH. The transmission parameters are sent to the UE through the HS-SCCH channel (step 204). The Node B then transmits the data channel (HS-PDSCH) using the selected transmission parameters (step 206).

Figure 4:
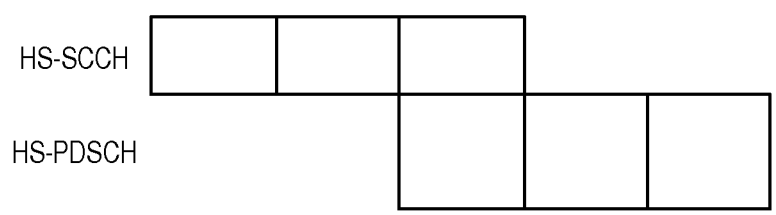
FIG. 4 illustrates the staggering of the High Speed Shared Control Channel (HS-SCCH) and the High Speed Physical Downlink Shared Channel (HS-PDSCH) in a HSDPA wireless system.

Notably, due to the scheduled nature of the HS-PDSCH, the control signaling is not needed all the time for a particular UE. For downlink, where the number of channelization codes is limited, it becomes beneficial to designate only a few control channels to be shared among the UEs. A HS-SCCH is assigned to a UE only when the UE is scheduled. In order to provide the UE with all the necessary information such as rank, modulation, and channelization codes, the HS-SCCH is staggered with HS-PDSCH as shown in FIG. 4, where the HS-SCCH is sent 2 slots ahead of the HS-PDSCH. Through successful decoding of the UE identification field, the intended UE is informed of the upcoming HS-PDSCH. The UE then decodes the rest of the HS-SCCH to obtain the necessary information such that the UE is prepared for decoding of HS-PDSCH.

Figure 5:
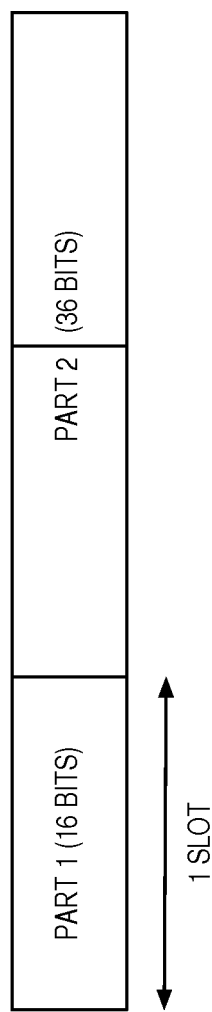
FIG. 5 illustrates Part 1 and Part 2 of the HS-SCCH.

According to 3GPP Technical Specification (TS) 25.212, Type 4 HS-SCCH for 4×4 MIMO in HSPA is used to report the downlink control channel when the UE is configured in MIMO mode with four transmit antennas. Type 4 HS-SCCH carries information about channelization code set, modulation and transport block information, precoding index and number of transport blocks, etc. Since the UE needs information about the channelization code set and modulation, precoding, rank information for setting up the weights for HS-PDSCH, the HS-SCCH is divided to two parts, namely, Part 1 and Part 2, as illustrated in FIG. 5.

Part 1 of the HS-SCCH consists of 16 bits. Seven of the bits are used to convey information about channelization code set, and five of the bits are used for joint encoding of modulation, number of transport blocks preferred. The remaining 4 bits are used to indicate PCI. Specifically, the number of transport blocks transmitted on the associated HS-PDSCH(s) and the modulation scheme information are jointly coded as shown in FIG. 6. Importantly, two of the bit patterns (i.e., 11110 and 11111) are unused. Part 2 of the HS-SCCH consists of 36 bits, six bits for each transport block (maximum 2), four bits for HARQ process, four bits for redundancy version for the two/three/four streams, and 16 bits for the UE Identifier (ID). For single stream transmission, only 28 bits are needed for Part 2.

In the following embodiments, the unused bit patterns 11110 and 11111 in Part 1 of the Type 4 HS-SCCH are utilized as feedback restriction indicators for different feedback restrictions. Notably, in other wireless systems (e.g., a 3GPP LTE system), similar types of unused bits or bit patterns in existing or future formats of the downlink control channel (e.g., PDCCH) can be used for restricting CSI reporting. The UE behavior when the unused bit patterns occur in the downlink control channel is unspecified. In some embodiments, the base station 12 (or other network node) uses these unused bit patterns to indicate that it prefers only a subset of CSI, e.g., subset of rank information. Once the UE 14 receives this bit pattern, the UE 14 assumes that only the corresponding subset of CSI parameters are to be evaluated when generating a feedback report (e.g., when determining the optimal, or best, rank, precoding matrix, and Channel Quality Indicator (CQI)).

Figure 7:
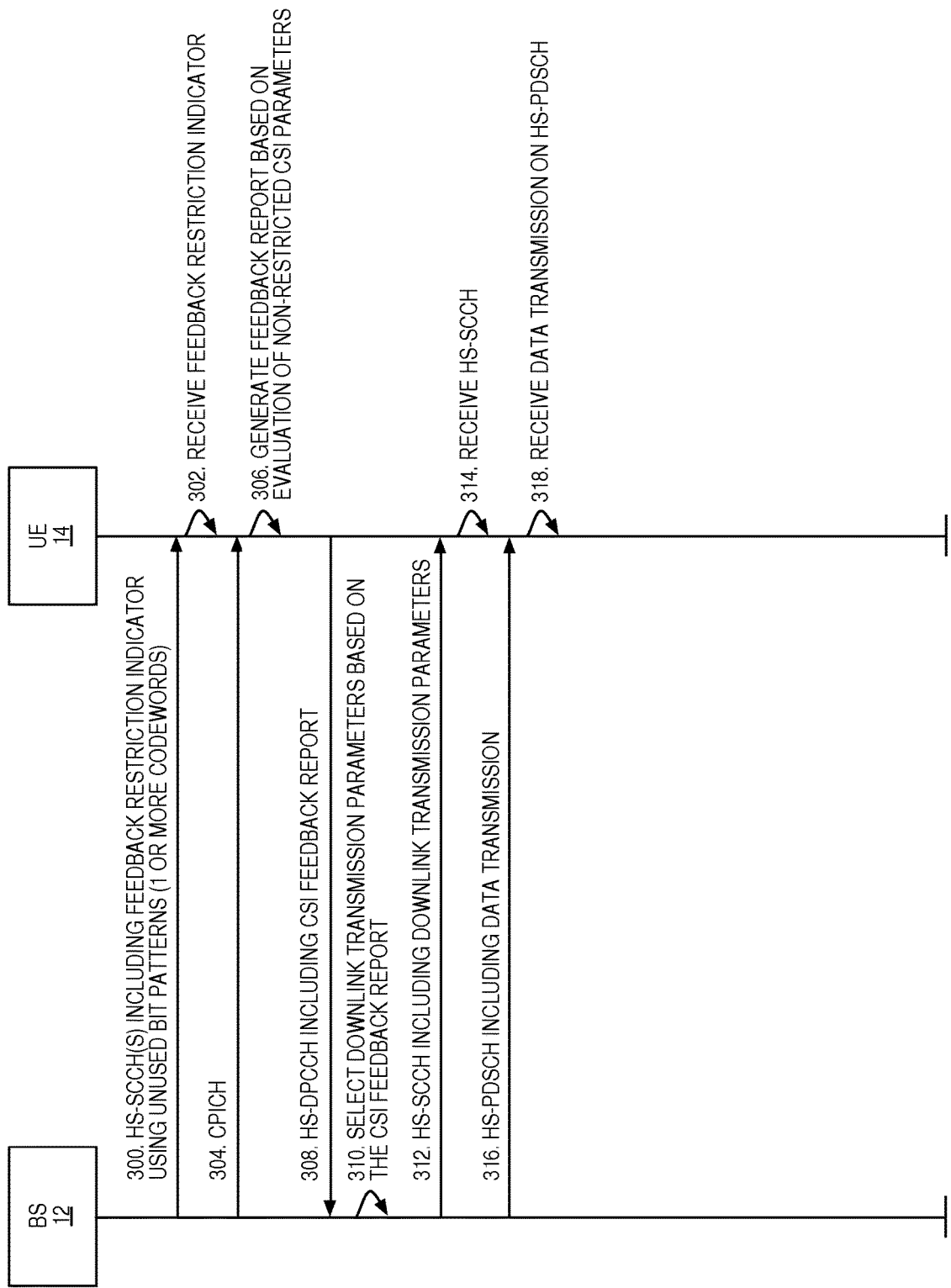
FIG. 7 illustrates the operation of the base station and the UE of FIG. 1 according to one embodiment in which the unused bit patterns in Part 1 of Type 4 HS-SCCH are utilized as feedback restriction indicators.

In this regard, FIG. 7 illustrates the operation of the base station 12 and the UE 14 according to one embodiment in which the unused bit patterns in Part 1 of Type 4 HS-SCCH are utilized as feedback restriction indicators. As illustrated, the base station 12 transmits one or more instances of a Type 4 HS-SCCH including a feedback restriction indicator using the unused bit patterns (step 300). An "instance" of the Type 4 HS-SCCH is the HS-SCCH transmitted in a single TTI. Thus, a single instance of the Type 4 HS-SCCH is the HS-SCCH transmitted in a single TTI. Conversely, multiple instances of the Type 4 HS-SCCH are multiple HS-SCCHs each being transmitted in a different TTI. The multiple instances of the Type 4 HS-SCCH may be transmitted in immediately adjacent TTIs or non-adjacent TTIs (i.e., some or all of the instances of the Type 4 HS-SCCH may be separated by one or more TTIs).

In step 300, in one embodiment, the feedback restriction is one of the unused bit patterns transmitted in a single instance of the Type 4 HS-SCCH that is mapped to, or otherwise indicative of, a desired restriction on CSI parameters to be evaluated by the UE 14 when generating a feedback report. In this case, the unused bit resource is sometimes referred to herein as a single codeword. In the single codeword embodiment, the base station 12 can send the feedback restriction indictor in every HS-SCCH transmission to the UE 14 or whenever the CSI is desired to be restricted.

In another embodiment, the feedback restriction is a particular combination of the unused bit patterns across multiple instances of the Type 4 HS-SCCH, where the combination is mapped to, or otherwise indicative of, a desired restriction on CSI parameters to be evaluated by the UE 14 when generating a feedback report. When using multiple instances of the Type 4 HS-SCCH, the unused bit resource is sometimes referred to herein as a multi-codeword. For the multi-codeword embodiment, the base station 12 can send the feedback restriction indicator periodically or whenever the CSI is desired to be restricted.

The UE 14 receives the instance(s) of the Type 4 HS-SCCH and decodes the feedback restriction indicator (step 302). In one embodiment, a mapping between a set of all possible feedback restriction indicators (e.g., all unused bit patterns in the single codeword embodiment or all possible combinations of the unused bit patterns in the multi-codeword embodiment) and corresponding feedback restrictions is stored by the UE 14. In another embodiment, this mapping is defined by a corresponding standard. Further, in some embodiments, the UE 14 determines whether to monitor for the feedback restriction indicator based on, e.g., one or more predefined rules and/or configurations provided by, e.g., the cellular network 10 or defined by a standard.

In addition to the feedback restriction indicator, the base station 12 transmits CPICH (step 304). Using the CPICH, the UE 14 generates a feedback report based on the feedback restriction indicated by the feedback restriction indicator (step 306). More specifically, in this embodiment, the feedback restriction indicator indicates a subset of CSI parameters ($C_{subset}$) from a predefined set of CSI parameters ($C_{set}$), where $C_{subset} \subseteq C_{set}$. The set of CSI parameters ($C_{set}$) can include any type(s) of CSI parameters such as, but not limited to, rank. Thus, using rank as an example, in one embodiment, the set of CSI parameters ($C_{set}$) consists of all possible ranks (i.e., rank 1, rank 2, etc.), and the subset of CSI parameters ($C_{subset}$) is some desired subset of the ranks. By restricting the ranks that are evaluated, the feedback restriction limits the precoding matrices that are to be evaluated to those precoding matrices associated with ranks in the desired subset of ranks (i.e., the non-restricted ranks). Then, using any suitable criteria or technique, the UE 14 generates the feedback report including, in one embodiment, the RI and PCI of the optimum, or best, rank and precoding matrix from those ranks and precoding matrices that are evaluated.

From this point, the process proceeds in the conventional manner. In particular, the UE 14 transmits the feedback report to the base station 12 in a HS-DPCCH (step 308). Upon receiving the feedback report, the base station 12 selects one or more downlink transmission parameters to be used for downlink data transmission to the UE 14 based on the feedback report (step 310). The downlink transmission parameter(s) include, e.g., downlink modulation, precoding index, and/or number of transport blocks. After selecting the downlink transmission parameter(s), the base station 12 transmits a HS-SCCH including the downlink transmission parameter(s) (step 312), which are then received by the UE 14 (step 314). The base station 12 also transmits a HS- PDSCH including a downlink data transmission for the UE 14 (step 316). The UE 14 then receives the downlink data transmission on the HS-PDSCH using the downlink transmission parameter(s) received in step 314 (step 318).

Figure 8:
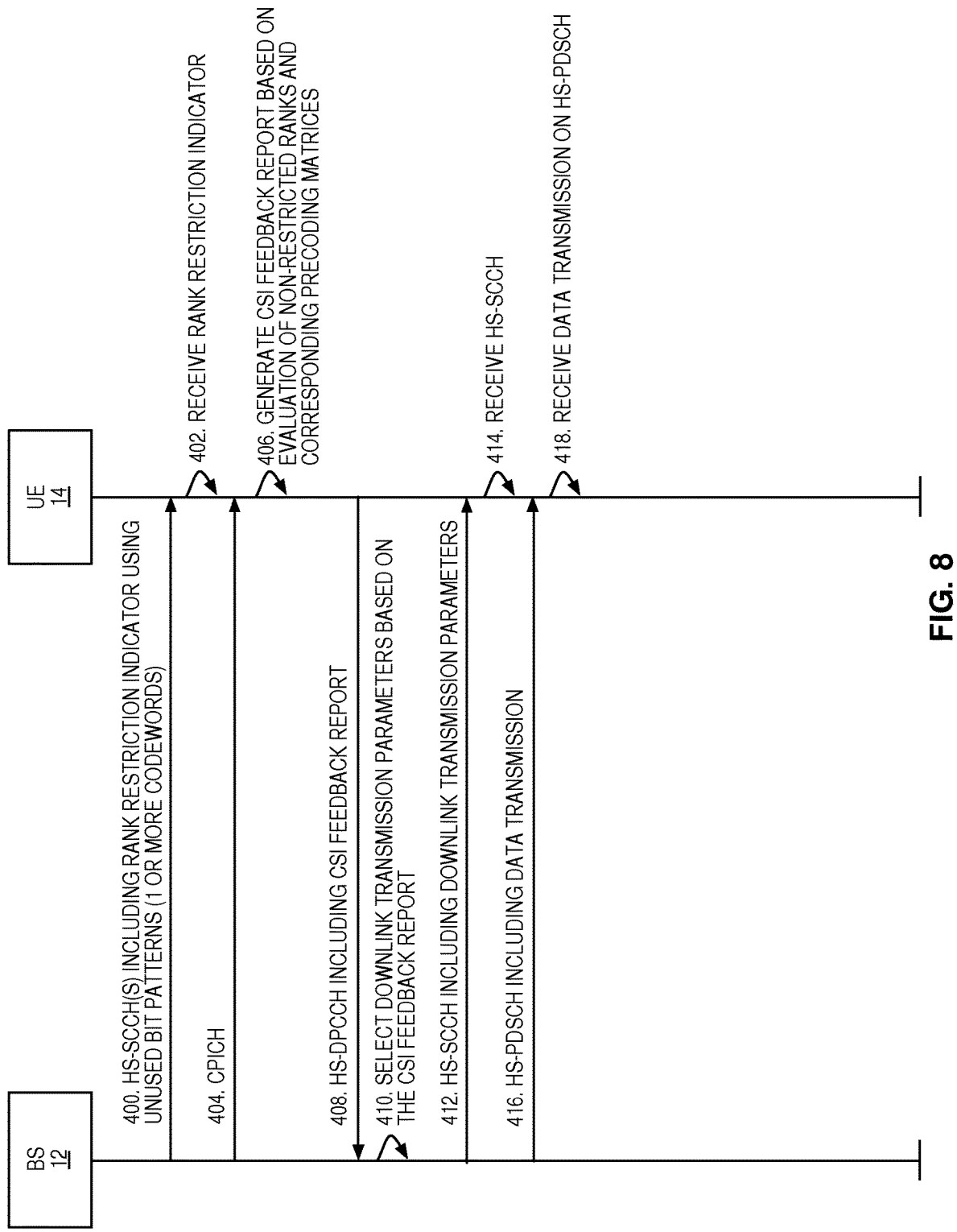
FIG. 8 illustrates the operation of the base station and the UE of FIG. 1 according to one embodiment in which the unused bit patterns in Part 1 of Type 4 HS-SCCH are utilized as feedback restriction indicators that are indicative of a feedback restriction on the ranks to be evaluated by the UE when generating a feedback report.

FIG. 8 illustrates an embodiment that is substantially the same as that of FIG. 7 but where the feedback restriction indicator is indicative of a feedback restriction on the ranks to be evaluated by the UE 14 when generating the feedback report. In this embodiment, the feedback restriction indicator is referred to as a rank restriction indicator. As illustrated, the base station 12 transmits one or more instances of a Type 4 HS-SCCH including a rank restriction indicator using the unused bit patterns (step 400). The rank restriction indicator is indicative of one or more ranks to be evaluated by the UE 14 when generating a feedback report. The UE 14 receives the instance(s) of the Type 4 HS-SCCH and decodes the rank restriction indicator (step 402). In addition to the rank restriction indicator, the base station 12 transmits CPICH (step 404). Using the CPICH, the UE 14 generates a feedback report based on evaluation of non-restricted ranks and corresponding precoding matrices (i.e., according to the rank restriction indicated by the rank restriction indicator) (step 406).

From this point, the process proceeds in the conventional manner. In particular, the UE 14 transmits the feedback report to the base station 12 in a HS-DPCCH (step 408). Upon receiving the feedback report, the base station 12 selects one or more downlink transmission parameters to be used for downlink data transmission to the UE 14 based on the feedback report (step 410). After selecting the downlink transmission parameter(s), the base station 12 transmits a HS-SCCH including the downlink transmission parameter(s) (step 412), which are then received by the UE 14 (step 414). The base station 12 also transmits a HS-PDSCH including a downlink data transmission for the UE 14 (step 416). The UE 14 then receives the downlink data transmission on the HS-PDSCH using the downlink transmission parameter(s) received in step 414 (step 418).

FIGS. 9A through 9C are tables that illustrate some example mappings of the unused bit patterns 11110 and 11111 in Type 4 HS-SCCH in HSPA to feedback restrictions according to one embodiment of the present disclosure. Specifically, FIG. 9A illustrates an embodiment in which the bit pattern 11110 corresponds to a feedback restriction that the UE 14 is to evaluate the precoding matrices belonging to only rank 1 and rank 2. Conversely, the bit pattern 11111 corresponds to a feedback restriction that the UE 14 is to evaluate the precoding matrices for all ranks. FIG. 9B illustrates an embodiment in which the bit pattern 11110 corresponds to a feedback restriction that the UE 14 is to evaluate the precoding matrices belonging to only rank 1 and rank 2. Conversely, the bit pattern 11111 corresponds to a feedback restriction that the UE 14 is to evaluate the precoding matrices belonging to only rank 3 and rank 4. Lastly, FIG. 9C illustrates an embodiment in which the bit pattern 11110 corresponds to a feedback restriction that the UE 14 is to evaluate the precoding matrices belonging to only rank 1 and rank 2. Conversely, the bit pattern 11111 corresponds to a feedback restriction that the UE 14 is to evaluate the precoding matrices belonging to any rank up to (and including) rank 3.

FIGS. 10A through 10C are tables that illustrate some example mappings of combinations of the unused bit patterns 11110 and 11111 in Type 4 HS-SCCH in HSPA to feedback restrictions for a 2-codeword embodiment of the present disclosure. Specifically, FIG. 10A illustrates an embodiment in which the combination of (11110, 11110) corresponds to a feedback restriction that the UE 14 is to evaluate the precoding matrices belonging to only rank 1; the combination of (11110, 11111) corresponds to a feedback restriction that the UE 14 is to evaluate the precoding matrices belonging to any rank up to (and including) rank 2; the combination of (11111, 11110) corresponds to a feedback restriction that the UE 14 is to evaluate the precoding matrices belonging to any rank up to (and including) rank 3; and the combination of (11111, 11111) corresponds to a feedback restriction that the UE 14 is to evaluate the precoding matrices belonging to any rank (i.e., in this case, any rank up to (and including) rank 4. FIG. 10B illustrates an embodiment in which the combination of (11110, 11110) corresponds to a feedback restriction that the UE 14 is to evaluate the precoding matrices belonging to only rank 1; the combination of (11110, 11111) corresponds to a feedback restriction that the UE 14 is to evaluate the precoding matrices belonging only rank 2 and rank 3; the combination of (11111, 11110) corresponds to a feedback restriction that the UE 14 is to evaluate the precoding matrices belonging to only rank 3 and rank 4; and the combination of (11111, 11111) corresponds to a feedback restriction that the UE 14 is to evaluate the precoding matrices belonging to any rank up to (and including) rank 3. FIG. 10C illustrates an embodiment in which the combination of (11110, 11110) corresponds to a feedback restriction that the UE 14 is to evaluate the precoding matrices belonging to only rank 1; the combination of (11110, 11111) corresponds to a feedback restriction that the UE 14 is to evaluate the precoding matrices belonging to only rank 2; the combination of (11111, 11110) corresponds to a feedback restriction that the UE 14 is to evaluate the precoding matrices belonging to only rank 3; and the combination of (11111, 11111) corresponds to a feedback restriction that the UE 14 is to evaluate the precoding matrices belonging to only rank 4.

Notably, the starting reference time of the 2-codeword pattern (or the N-codeword pattern in general) can be predefined or pre-configured at the UE 14 by a network node (e.g., the base station 12), e.g., during initial setup of a Radio Resource Control (RRC) connection. This will allow the UE 14 to determine when the 2-codeword pattern starts. In some embodiments, the 2-codeword pattern is sent over, e.g., two consecutive HS-SCCH instances or in two consecutive TTIs. The reference time can be expressed in terms of start of, e.g., a certain frame number, a certain subframe number, or a certain slot or a certain symbol. As some non-limiting examples, it may be predefined or configured at the UE 14 that the 2-codeword pattern starts: from the beginning of a radio frame, i.e., subframe 0 of a radio frame, from a certain subframe or slot of a radio frame, e.g., subframe 2 of a radio frame, or from a start of a certain radio frame, e.g., from System Frame Number (SFN)=0, SFN mod 2=0, SFN mod 8=0, etc.

Figure 11:
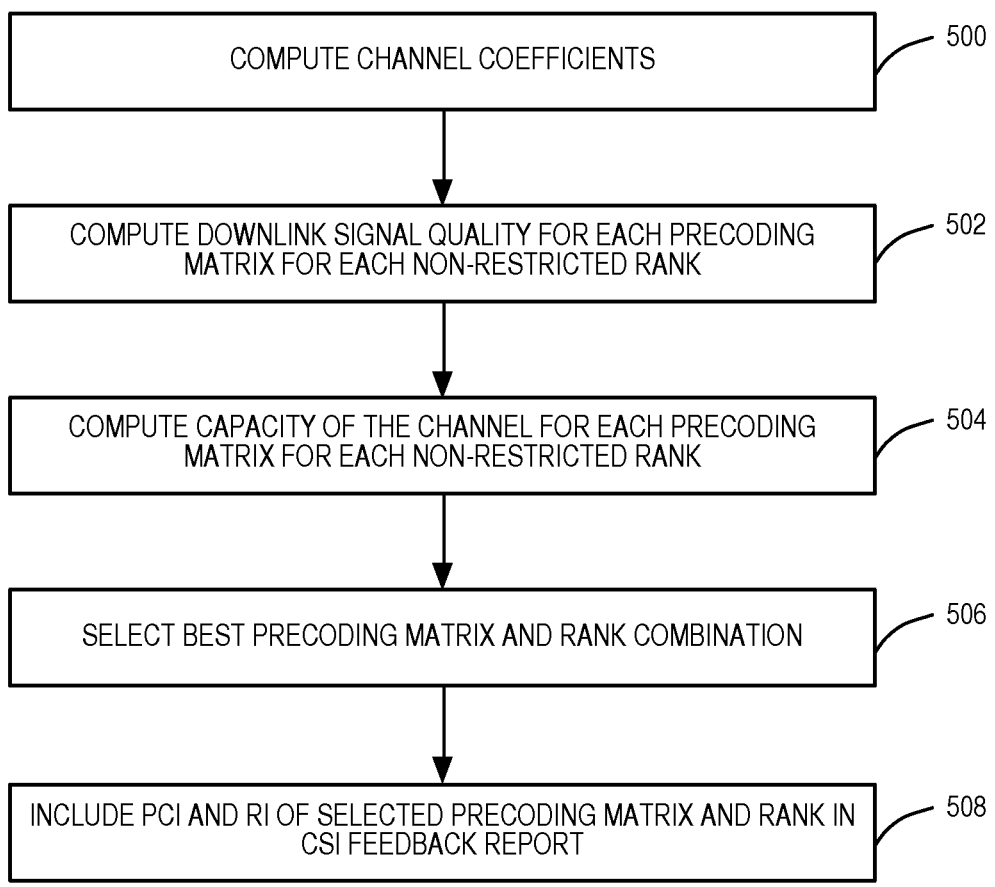
FIG. 11 is a flow chart that illustrates the operation of the UE of FIG. 1 to generate a feedback report according to feedback restrictions identified by a received feedback indicator according to one embodiment of the present disclosure.

FIG. 11 is a flow chart that illustrates the operation of the UE 14 to generate a feedback report according to feedback restrictions identified by a received feedback indicator according to one embodiment of the present disclosure. In this embodiment, the feedback restriction is a rank restriction; however, this process is applicable to any desired CSI parameter type(s). As illustrated, the UE 14 first computes channel coefficients to thereby estimate a channel between the transmitter of the base station 12 and the receiver of the UE 14 (step 500). The UE 14 also computes a downlink signal quality (e.g., SNR, SINR, etc.) for each precoding matrix in the codebook(s) for the non-restricted rank(s) as indicated by a feedback restriction indicator received from the base station 12 (step 502). The UE 14 then computes a capacity (C) of each precoding matrix in the codebook(s) for the non-restricted rank(s) as a function of the corresponding downlink channel quality (step 504). As one example, the capacity (C) may be computed as:

$$C=\log_2(1+SNR).$$

The UE 14 then selects the best precoding matrix and rank combination (step 506). In other words, the UE 14 selects the precoding matrix that results in the best channel capacity (C) and the corresponding rank. The UE 14 then includes a PCI and RI of the selected precoding matrix and rank in a feedback report (step 508).

Using the process of FIG. 11, the UE 14 needs to evaluate only those precoding matrices in the non-restricted ranks. Thus, if there four ranks and sixteen precoding matrices per rank for a total of 64 precoding matrices and the feedback restriction indicator indicates that only rank 1 and rank 2 are to be evaluated, then the UE 14 needs to measure downlink signal quality and compute the channel capacity for only 32 of the 64 precoding matrices. This reduces the complexity of generating the feedback report at the UE 14.

Figure 12:
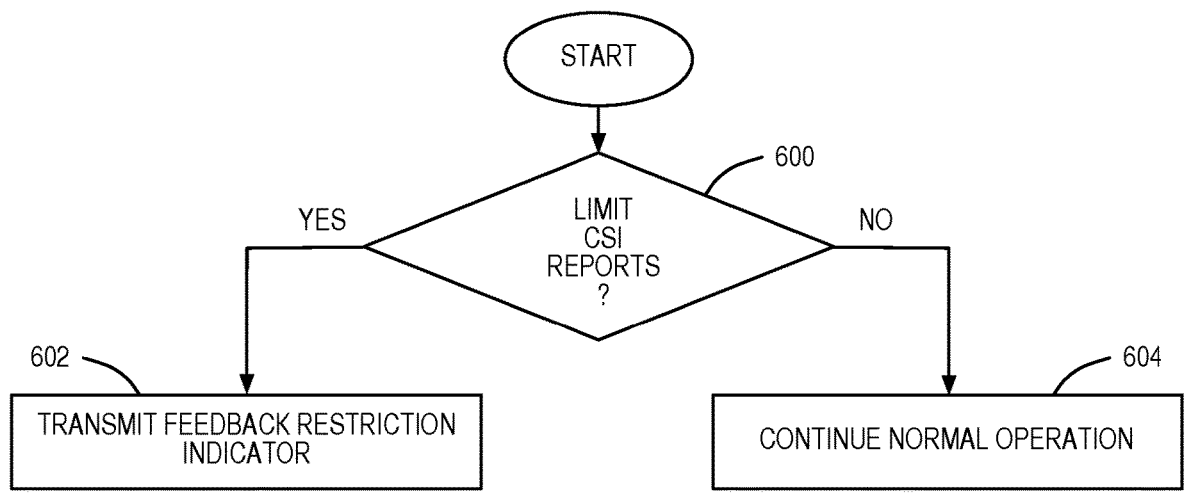
FIG. 12 is a flow chart that illustrates the operation of the base station 12 of FIG. 1, or some other network node, to decide whether to transmit a feedback restriction indicator to the UE according to one embodiment of the present disclosure.

In the embodiments above, the base station 12 (or other network node) sends a feedback restriction indicator to the UE 14. In some embodiments, the base station 12 (or other network node) first decides whether to restrict feedback and, if so, what feedback restrictions are desired. In this regard, FIG. 12 is a flow chart that illustrates the operation of the base station 12 (or other network node) to decide whether to transmit a feedback restriction indicator to the UE 14 according to one embodiment of the present disclosure. As illustrated, the base station 12 first determines whether it is desirable to limit, or restrict, feedback from the UE 14 (step 600). In this decision, the base station 12 also decides what feedback restriction(s) are desired, if any. The base station 12 may use any suitable criteria for this decision. Some non-limiting examples are: received signal quality at the UE 14, e.g., SNR, path loss, SINR, Bit Error Rate (BER), Block Error Rate (BLER), Frame Error Rate (FER) etc.; UE 14 speed; statistics of usage of CSI by the base station 12, another network node, or the cellular network 10 in general; statistics of CSI reports from the UE 14 and/or other UEs; a traffic load of a cell served by the base station 12; UE 14 load due to parallel procedures being performed by the UE 14; UE 14 battery life and power consumption; or any combination thereof. Each of these criteria are discussed below in more detail.

With respect to received signal quality, FIG. 13 graphically illustrates a simulated rank distribution as a function of long term SNR (path loss/geometry) for one example of a four branch MIMO system. From FIG. 13, it can be seen that there is a high probability that rank is either equal to rank 1 or rank 2 at low SNR, a high probability that the rank is either equal to rank 2 or rank 3 at medium SNR, and a high probability that rank is either rank 3 or rank 4 at high SNR. Hence, in one embodiment, if the base station 12 knows the long term SNR for the UE 14, then the base station 12 can decide to restrict feedback to the corresponding ranks.

FIG. 14 graphically illustrates simulation results for average link throughput with only subsets of ranks for one example implementation. For comparison, the link throughput when using a full search (i.e., when evaluating all precoding matrices in the codebooks for all ranks) is also illustrated. In this example, it can be seen that feedback can be restricted to only rank 1 and rank 2 at low SNR, in which case performance is almost equal to that of the full search. Similarly, it can be seen that feedback can be restricted to only rank 3 and rank 4 at high SNR, in which case performance is almost equal to that of the full search. Hence, in one embodiment, the base station 12 can decide to restrict feedback to either rank 1 and rank 2 or rank 3 and rank 4 depending on the signal quality (e.g., path loss/long term SINR) for the UE 14. In doing so, complexity at the UE 14 is reduced without significantly impacting performance. Notably, the base station 12 can determine the received signal quality for the UE 14 based on UE 14 reported measurement(s) such as, e.g., CQI reports, BLER based on ACK/NACK sent for downlink data reception, etc.

Regarding UE 14 speed, in one embodiment, the base station 12 can decide what feedback restrictions are desired, if any, based on the speed of the UE 14. In one embodiment, the UE 14 speed can be used to decide whether any rank restrictions are desired. For example, if the UE 14 is moving with a high speed (e.g., 60 kilometers (km)/hour or more), the base station 12 may decide to restrict feedback to lower rank(s) (e.g., rank 1 and rank 2) such that the probability of packet error is minimized to diversity. Conversely, if the UE 14 is moving with low speed or not moving at all, the base station 12 may decide to not restrict feedback (e.g., send a feedback indicator that indicates that all ranks are to be evaluated or send no feedback indicator at all). The UE 14 speed can be determined by the base station 12 or received in reports from the UE 14. The UE 14 speed can be expressed in terms of Doppler frequency and/or in terms of distance over per unit time.

Regarding statistics of usage of CSI, the base station 12 may decide what feedback restrictions are desired, if any, based on historical data or statistics related to the CSI actually used by the base station 12 for scheduling the UE 14. The historical data can be collected over the last certain time period, e.g., 30 seconds or more. The statistics may also be obtained from the CSI used by the base station 12 for multiple UEs, which may or may not include the UE 14, over certain time period. For example, if the base station 12 typically uses rank 1 and rank 2 transmissions, then the base station 12 may decide to send a feedback restriction indicator that restricts evaluation of CSI parameters by the UE 14 when generating the feedback report to only rank 1 or rank 2.

Regarding statistics of CSI reports from the UE 14 and/or other UEs, the base station 12 may also use historical data or statistics related to the CSI actually reported by the UE 14 and/or other UEs to the base station 12 when deciding what feedback restrictions, if any, are desired. The historical data related to the CSI results reported by the UE 14 and/or other UEs can be collected over a certain time period, stored, and processed to determine the desired feedback restriction. For example, the statistics can be collected over the last 30 seconds or more for the same UE 14 or for multiple UEs. As an example of the decision process, if the UE 14 typically reports rank 3 and rank 4 transmissions, then the base station 12 may decide to send a feedback restriction indicator that restricts evaluation of CSI parameters by the UE 14 when generating the feedback report to only rank 3 or rank 4.

Regarding traffic load, the base station 12 may also determine and use traffic load when deciding the desired feedback restriction, if any. In one example, the traffic load can be related to a load of the UE 14, e.g., an amount of traffic in a transmit buffer or simply buffer size for downlink transmission to the UE 14, which may be expressed, e.g., in terms of bits or bytes of data. In another example, the traffic load can be related to the load of multiple UEs. In yet another example, the traffic load can be related to the overall load in the UE 14. In one example of the decision process, if the UE 14 specific traffic load is below a threshold (e.g., 30% of maximum UE 14 buffer size), then the base station 12 may decide to send a feedback restriction indicator that restricts evaluation of CSI parameters by the UE 14 when generating the feedback report to only rank 1 and rank 2 or CQI with a value below a threshold (e.g., CQI that corresponds to TBS below a threshold). The relationship between the CQI value and the TBS, which can be used for transmitting data to the UE 14 by the network node, is predefined in the standard. As another example, if the UE 14 specific traffic load is above a threshold (e.g., 70% of maximum UE 14 buffer size) and cell specific load is low or moderate (e.g., 50% of maximum cell buffer size), then the base station 12 may decide to send a feedback restriction indicator that restricts evaluation of CSI parameters to those that correspond to a higher data rate, e.g., all ranks up to rank 4 or only rank 3 and rank 4.

Regarding UE 14 load due to parallel procedures, the UE 14 may be configured with several procedures in parallel. This may lead to a reduced amount of resources (e.g., memory, processor, etc.) for processing measurements related to advanced features like 4×4 MIMO. For example, the UE 14 may be configured to: operate in multi-carrier, perform radio measurements on inter-frequency carriers, and perform radio measurements on inter-RAT carriers (e.g., GSM, LTE, etc.). In such a situation or complex configuration, the UE 14 may not be able to accurately evaluate all possible CSI parameters. Therefore, the base station 12 may decide to proactively restrict the CSI parameters to be evaluated by the UE 14 to a reduced subset of CSI parameters such as, e.g., only rank 1 and rank 2.

Regarding UE 14 battery life and power consumption, evaluating all possible CSI parameters (e.g., all possible ranks), especially when the UE 14 is in a Discontinuous Receive (DRX) mode of operation, can drain UE 14 battery life. The base station 12 can determine the battery life of the UE 14 (also referred to as a status of the battery life of the UE 14) based on an indication from the UE 14 and/or autonomously. If the UE 14 battery is low, then the base station 12 may, in one embodiment, decide to restrict the CSI parameters to be evaluated by the UE 14 to a reduced subset of CSI parameters such as, e.g., only rank 1 and rank 2. In some embodiments, the base station 12 may also instruct or otherwise indicate to the UE 14 that the UE 14 is to perform the full CSI reporting (i.e., evaluate all CSI parameters) in case the UE 14 battery life subsequently increases above a threshold.

Again, while various criteria for deciding what feedback restrictions, if any, are desired are discussed above, additional or alternative criteria may be used. Further, any single criterion discussed above or any combination of the criteria discussed above may be used for the decision. For example, the base station 12 may only decide to restrict feedback reporting for the UE 14 to rank 1 and rank 2 provided that collected statistics indicate that rank 3 and rank 4 have rarely been used by the base station 12 and if UE 14 traffic load is low.

Returning to FIG. 12, if the base station 12 decides to restrict CSI reporting of the UE 14, then, in this embodiment, the base station 12 transmits a feedback restriction indicator to the UE 14 that is indicative of the desired feedback restriction (step 602). Conversely, in this embodiment, if no feedback restriction is desired, the base station 12 continues normal operation (i.e., does not transmit a feedback restriction indicator) (step 604). Note, however, that even in the case where no feedback restriction is desired, the base station 12 may transmit a feedback restriction indicator that is indicative of no feedback restriction (e.g., a feedback restriction indicator that indicates that all ranks are to be evaluated).

FIG. 15 is a flow chart that illustrates a process by which the UE 14 determines whether to monitor for a feedback restriction indicator according to one embodiment of the present disclosure. In some embodiments, the UE 14 may not always monitor for a feedback restriction indicator. As such, the UE 14 must be determine whether it is to monitor for a feedback restriction indicator based on, e.g., a predefined rule, a pre-configuration by the cellular network 10, or a combination thereof. More specifically, as illustrated, the UE 14 determines whether it is to monitor for unused bit resources used as a feedback restriction indicator (step 700). Again, in one embodiment, the UE 14 makes this determination based on one or more predefined rules. For example, a set of unused bit resources (e.g., unused bit patterns or combinations of unused bit patterns) and the corresponding feedback restrictions may be predefined and stored in memory at the UE 14 along with a rule that these mappings are to be used under certain conditions such as, e.g., reception of a downlink control channel in a particular format (e.g., HS-SCCH for 4×4 MIMO). If such a mapping is stored and the rule is satisfied, then the UE 14 decides that it should monitor for a feedback restriction indicator (step 702). If the UE 14 decided that it should not monitor for a feedback restriction indicator, the UE 14 continues normal operation (step 704).

In another embodiment, the UE 14 makes the decision as to whether to monitor for the feedback restriction indicator based on a pre-configuration by the cellular network 10. More specifically, the cellular network 10 may pre-configure the mapping between a set of unused bit resources and feedback restrictions (i.e., pre-configure purposes for those unused bit resources). This configuration may be done, e.g., during initial setup of a connection. In this case, the UE 14 determines the mapping between unused bit resources and their corresponding feedback restrictions from the latest configuration received from, e.g., the base station 12. The pre-configuration can be done using, e.g., higher layer signaling such as, for example, RRC signaling from, e.g., a RNC. Using pre-configuration is more flexible than using predefined rules. For example, pre-configuration may be used to enable the base station 12 to configure and reconfigure the mappings between the unused bit resources and corresponding feedback restrictions, e.g., according to the need and demand.

In another embodiment, the UE 14 makes the decision as to whether to monitor for the feedback restriction indicator based on a combination of one or more predefined rules and pre-configuration by the cellular network 10. For example, the UE 14 may have predefined information such that unused bit resources are used by the base station 12 for restricting the searching of the rank for 4×4 MIMO. However, the exact mapping between the unused bit resources and the corresponding rank restrictions may be pre-configured at the UE 14. There may also be more than one predefined mappings between unused bits and restricted CSI reporting, where each such mapping is associated with a predefined identifier. In this case the configuration may therefore also include configuring the UE 14 with a predefined identifier of one of the predefined mappings between unused bits and restricted CSI reporting.

While the base station 12 (or any type of radio access node in the radio access network) may be implemented in hardware or any combination of hardware and/or software, FIG. 16 is a block diagram of the base station 12 according to one embodiment of the present disclosure. Note that while the base station 12 is discussed herein, the functionality of the base station 12 with respect to providing a feedback restriction indicator to the UE 14 may be performed by any suitable type of network node. As illustrated, the base station 12 includes a baseband unit 16 including a processor 18, memory 20, and a network interface 22 and a radio unit 24 including a transceiver 26 coupled to one or more antennas 28. In one embodiment, the functionality of the base station 12 described herein is implemented in software stored in the memory 20 and executed by the processor 18. Additionally, the base station 12 may include additional components responsible for providing additional functionality, including any of the functionality described above and/or any functionality necessary to support the embodiments described herein.

FIG. 17 is a functional block diagram of the base station 12 according to one embodiment of the present disclosure. As illustrated, the base station 12 includes a feedback restriction indicator transmission module 30, a feedback report reception module 32, a downlink transmission parameter selection and transmission module 34, and a downlink data transmission module 36, each of which is implemented in software executed by one or more processors (e.g., the processor 18 of FIG. 16). The feedback restriction indicator transmission module 30 operates to provide feedback restriction indicators to UEs, such as the UE 14, according to, e.g., any of the embodiments described herein. The feedback report reception module 32 operates to receive feedback reports from UEs, such as the UE 14. The downlink transmission parameter selection and transmission module 34 operates to select downlink transmission parameters for UEs, such as the UE 14, based on corresponding feedback reports and to provide the selected transmission parameters to the appropriate UEs. Lastly, the downlink data transmission module 36 operates to transmit data to UEs, such as the UE 14, using the selected transmission parameters.

In one embodiment, a computer program including instructions which, when executed by at least one processor, cause the at least one processor (e.g., the processor 18) to carry out the functionality of a network node (e.g., the base station 12) according to any one of the embodiments described herein is provided. In one embodiment, a carrier containing the aforementioned computer program product is provided. The carrier is one of an electronic signal, an optical signal, a radio signal, or a computer-readable storage medium (e.g., a non-transitory computer-readable medium such as the memory 20).

While the UE 14 may be implemented in any type of hardware or any combination of hardware and software, FIG. 18 is a block diagram of the UE 14 according to one embodiment of the present disclosure. As illustrated, the UE 14 includes a processor 38, memory 40, and a transceiver 42 coupled to one or more antennas 44. In some embodiments, the number of antennas 44 is more than one. In particular embodiments, some or all of the functionality described above as being provided by the UE 14 may be provided by the processor 38 executing instructions stored on a computer-readable medium, such as the memory 40. Alternative embodiments of the UE 14 may include additional components responsible for providing additional functionality, including any of the functionality identified above and/or any functionality necessary to support the embodiments described above.

FIG. 19 is a functional block diagram of the UE 14 according to one embodiment of the present disclosure. As illustrated, the UE 14 includes a feedback restriction indicator reception module 46, a feedback report generation module 48, a feedback report transmission module 50, a downlink transmission parameter reception module 52, and a downlink data reception module 54, each of which is implemented in software executed by one or more processors (e.g., the processor 38 of FIG. 18). The feedback restriction indicator reception module 46 operates to receive a feedback restriction indicator according to any of the embodiments described above. The feedback report generation module 48 operates to generate a feedback report according to the feedback restriction(s) indicated by the feedback restriction indicator. The feedback report transmission module 50 then operates to transmit the feedback report to the base station 12. The downlink transmission parameter reception module 52 then receives downlink transmission parameters from the base station 12, where these downlink transmission parameters were selected by the base station 12 based on the feedback report. Lastly, the downlink data reception module 54 operates to receive a downlink data transmission from the base station 12 based on the downlink transmission parameters received by the base station 12.

In one embodiment, a computer program including instructions which, when executed by at least one processor, cause the at least one processor (e.g., the processor 38) to carry out the functionality of a UE 14 according to any one of the embodiments described herein is provided. In one embodiment, a carrier containing the aforementioned computer program product is provided. The carrier is one of an electronic signal, an optical signal, a radio signal, or a computer-readable storage medium (e.g., a non-transitory computer-readable medium such as the memory 40).

Embodiments described herein provide a number of advantages. As some non-limiting examples, the embodiments described herein can substantially reduce complexity at the UE 14 (or receiving node) by reducing the number of parameters that need to be evaluated when generating a feedback report. Further, in embodiments where the UE 14 is battery powered, battery life at the UE 14 is improved. The reduction in the number of parameters that need to be evaluated when generating the feedback report reduces processing at the UE 14 and reduces the amount of hardware resources needed to evaluate parameters for the feedback report at the UE 14.

The following acronyms are used throughout this disclosure.

3GPP $3^{rd}$ Generation Partnership Project
ACK Acknowledgement
AP Access Point
BER Bit Error Rate
BLER Block Error Rate
BS Base Station
BSC Base Station Controller
BTS Base Transceiver Station
CA Carrier Aggregation
CDMA2000 Code Division Multiple Access 2000
CPICH Common Pilot Channel
CSI Channel State Information
CQI Channel Quality Indicator
D2D Device-to-Device
DAS Distributed Antenna System
DFT Discrete Fourier Transform
DRX Discontinuous Receive
eNB Evolved or Enhanced Node B
FDD Frequency Division Duplexing
FER Frame Error Rate GERAN Global System for Mobile Communications Enhanced Data Rates for Global System for Mobile Communications Evolution Radio Access Network
GSM Global System for Mobile Communications
HARQ Hybrid Automatic Repeat Request
HSDPA High Speed Downlink Packet Access
HS-DPCCH High Speed Dedicated Physical Control Channel
HSPA High Speed Packet Access
HS-PDSCH High Speed Physical Downlink Shared Channel
HS-SCCH High Speed Shared Control Channel
ID Identifier
km Kilometer
LEE Laptop Embedded Equipment
LME Laptop Mounted Equipment
LTE Long Term Evolution
M2M Machine-to-Machine
MC MultiCarrier
MIMO Multiple-Input Multiple-Output
MOD Modulation
ms Millisecond
MSR Multi-Standard Radio
NACK Negative Acknowledgement
PCI Precoding Indicator
PDA Personal Digital Assistant
PDCCH Physical Downlink Control Channel
PDSCH Physical Downlink Shared Channel
PMI Precoding Matrix Indicator
PUCCH Physical Uplink Control Channel
PUSCH Physical Uplink Shared Channel
RAT Radio Access Technology
RI Rank Indicator
RNC Radio Network Controller
RRC Radio Resource Control
RRH Remote Radio Head
RRU Remote Radio Unit
SFN System Frame Number
SINR Signal to Interference Plus Noise Ratio
SM Spatial Multiplexing
SNR Signal to Noise Ratio
TBS Transport Block Size
TDD Time Division Duplexing
TS Technical Specification
TTI Transmit Time Interval
UE User Equipment
UMTS Universal Mobile Telecommunications System
USB Universal Serial Bus
UTRA Universal Terrestrial Radio Access
UTRAN Universal Terrestrial Radio Access Network
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a transmitting node in a wireless network, comprising:
selecting one or more desired restrictions on parameters to be evaluated by a receiving node for a feedback report based on one or more selection criteria;
transmitting a feedback restriction indicator to the receiving node by transmitting one of two or more unused bit resources, each being indicative of one or more different restrictions on the parameters to be evaluated by the receiving node for the feedback report that corresponds to the one or more desired restrictions as the feedback restriction indicator, the feedback restriction indicator being an unused bit resource in one or more instances of a control channel that is indicative of the one or more desired restrictions on the parameters to be evaluated by the receiving node for the feedback report to be provided from the receiving node, the unused bit resource being a bit resource in the one or more instances of the control channel that is not used to convey one or more transmission parameters that are to be applied by the transmitting node in transmitting data to the receiving node; and
receiving the feedback report from the receiving node, the feedback report being limited according to the feedback restriction indicator;
wherein the one or more selection criteria comprise at least one of the group consisting of: a received signal quality at the receiving node, a speed of the receiving node, statistics of usage of the feedback reports by the transmitting node, statistics of the feedback reports from the receiving node, a traffic load, a load at the receiving node due to parallel procedures, a battery life at the receiving node, and a power consumption at the receiving node.

2. The method of claim 1, further comprising transmitting transmission parameters to the receiving node based on the feedback report, the transmission parameters specifying one or more transmission characteristics that are to be applied by the transmitting node in transmitting data to the receiving node.

3. The method of claim 1 wherein the two or more unused bit resources are two or more unused bit patterns in a same field of one instance of the control channel each being indicative of the one or more different restrictions on the parameters to be evaluated by the receiving node for the feedback report.

4. The method of claim 1 wherein the control channel is a Type 4 High Speed Shared Control Channel (HS-SCCH) and the two or more unused bit resources comprise two unused bit patterns in a Modulation (MOD) field in Part 1 of the HS-SCCH in one instance of the HS-SCCH, each of the two unused bit patterns being indicative of the one or more different restrictions on the parameters to be evaluated by the receiving node for the feedback report.

5. The method of claim 1 wherein the two or more unused bit resources are two or more combinations of unused bit patterns in a same field of two or more instances of the control channel, each of the two or more combinations of unused bit patterns being indicative of the one or more different restrictions on the parameters to be evaluated by the receiving node for the feedback report.

6. The method of claim 1 wherein the control channel is a Type 4 High Speed Shared Control Channel (HS-SCCH) and the two or more unused bit resources comprise two or more combinations of two unused bit patterns in a Modulation (MOD) field in Part 1 of the HS-SCCH in two or more instances of the HS-SCCH, each of the two or more combinations of the two unused bit patterns in the two or more instances of the HS-SCCH being indicative of the one or more different restrictions on the parameters to be evaluated by the receiving node for the feedback report.

7. The method of claim 1 wherein transmitting the feedback restriction indicator comprises transmitting one of the two or more unused bit resources that is indicative of the one or more desired restrictions on the parameters to be evaluated by the receiving node for the feedback report.

8. The method of claim 1 wherein, for each unused bit resource of the two or more unused bit resources, the one or more different restrictions indicated by the unused bit resource restrict evaluation of the parameters by the receiving node for the feedback report to a subset of Channel State Information (CSI) parameters $C_{subset}$ from a defined set of CSI parameters $C_{set}$, where $C_{subset} \subseteq C_{set}$.

9. The method of claim 8 wherein the subset of CSI parameters $C_{subset}$ for at least one of the unused bit resources includes one or more but less than all CSI parameters in the defined set of CSI parameters $C_{set}$.

10. The method of claim 8 wherein the defined set of CSI parameters $C_{set}$ comprises any one or more of: two or more rank indicators, two or more precoding indices, and two or more Channel Quality Indicators (CQIs).

11. The method of claim 1 wherein the unused bit resource is one of a group consisting of: an unused bit in one instance of the control channel, an unused bit pattern in one instance of the control channel, and a combination of unused bit patterns in two or more instances of the control channel.

12. The method of claim 1 wherein the control channel is a Type 4 High Speed Shared Control Channel (HS-SCCH) and the unused bit resource is an unused bit pattern in a Modulation (MOD) field in Part 1 of the HS-SCCH.

13. A transmitting node in a wireless network, comprising:
a transceiver;
a processor associated with the transceiver; and
memory containing software executable by the processor whereby the transmitting node operates to:
select one or more desired restrictions on parameters to be evaluated by a receiving node for a feedback report based on one or more selection criteria;
transmit a feedback restriction indicator to the receiving node by being operable to transmit one of two or more unused bit resources, each being indicative of one or more different restrictions on the parameters to be evaluated by the receiving node for the feedback report that corresponds to the one or more desired restrictions as the feedback restriction indicator, the feedback restriction indicator being an unused bit resource in one or more instances of a control channel that is indicative of the one or more desired restrictions on the parameters to be evaluated by the receiving node for the feedback report to be provided from the receiving node, the unused bit resource being a bit resource in the one or more instances of the control channel that is not used to convey one or more transmission parameters that are to be applied by the transmitting node in transmitting data to the receiving node; and
receive the feedback report from the receiving node, the feedback report being limited according to the feedback restriction indicator;
where the one or more selection criteria comprise at least one of the group consisting of: a received signal quality at the receiving node, a speed of the receiving node, statistics of usage of the feedback reports by the transmitting node, statistics of the feedback reports from the receiving node, a traffic load, a load at the receiving node due to parallel procedures, a battery life at the receiving node, and a power consumption at the receiving node.

14. A method of operation of a receiving node in a wireless network, comprising:
receiving a feedback restriction indicator from a transmitting node by receiving one of two or more unused bit resources, each being indicative of one or more different restrictions on parameters to be evaluated by the receiving node for a feedback report that corresponds to one or more desired restrictions as the feedback restriction indicator, the feedback restriction indicator being an unused bit resource in one or more instances of a control channel that is indicative of the one or more desired restrictions on the parameters to be evaluated by the receiving node for the feedback report to be provided to the transmitting node from the receiving node, the unused bit resource being a bit resource in the one or more instances of the control channel that is not used to convey one or more transmission parameters that are to be applied by the transmitting node in transmitting data to the receiving node; and
transmitting the feedback report based on the feedback restriction indicator to the transmitting node.

15. The method of claim 14, further comprising, prior to transmitting the feedback report, generating the feedback report according to the feedback restriction indicator.

16. The method of claim 14 wherein the two or more unused bit resources are two or more unused bit patterns in a same field of one instance of the control channel each being indicative of the one or more different restrictions on the parameters to be evaluated by the receiving node for the feedback report.

17. The method of claim 14 wherein the control channel is a Type 4 High Speed Shared Control Channel (HS-SCCH) and the two or more unused bit resources comprise two unused bit patterns in a Modulation (MOD) field in Part 1 of the HS-SCCH in one instance of the HS-SCCH, each of the two unused bit patterns being indicative of the one or more different restrictions on the parameters to be evaluated by the receiving node for the feedback report.

18. The method of claim 14 wherein the two or more unused bit resources are two or more combinations of unused bit patterns in a same field of two or more instances of the control channel, each of the two or more combinations of unused bit patterns being indicative of the one or more different restrictions on the parameters to be evaluated by the receiving node for the feedback report.

19. The method of claim 14 wherein the control channel is a Type 4 High Speed Shared Control Channel (HS-SCCH) and the two or more unused bit resources comprise two or more combinations of two unused bit patterns in a Modulation (MOD) field in Part 1 of the HS-SCCH in two or more instances of the HS-SCCH, each of the two or more combinations of the two unused bit patterns in the two or more instances of the HS-SCCH being indicative of the one or more different restrictions on the parameters to be evaluated by the receiving node for the feedback report.

20. The method of claim 14 wherein, for each unused bit resource of the two or more unused bit resources, the one or more different restrictions indicated by the unused bit resource restrict evaluation of the parameters by the receiving node for the feedback report to a subset of Channel State Information (CSI) parameters $C_{subset}$ from a defined set of CSI parameters $C_{set}$, where $C_{subset} \subseteq C_{set}$.

21. The method of claim 20 wherein the subset of CSI parameters $C_{subset}$ for at least one of the unused bit resources includes one or more but less than all CSI parameters in the defined set of CSI parameters $C_{set}$.

22. The method of claim 20 wherein the defined set of CSI parameters $C_{set}$ comprises any one or more of: two or more rank indicators, two or more precoding indices, and two or more Channel Quality Indicators (CQIs).

23. The method of claim 14 further comprising:
- determining that unused bit resources are to be used for transmission of feedback restriction indicators;
- wherein receiving the feedback restriction indicator comprises monitoring for transmission of the unused bit resource in response to determining that unused bit resources are to be used for transmission of feedback restriction indicators.

24. The method of claim 14 wherein the unused bit resource is one of a group consisting of: an unused bit in one instance of the control channel, an unused bit pattern in one instance of the control channel, and a combination of unused bit patterns in two or more instances of the control channel.

25. The method of claim 14 wherein the control channel is a Type 4 High Speed Shared Control Channel (HS-SCCH) and the unused bit resource is an unused bit pattern in a Modulation (MOD) field in Part 1 of a High Speed Shared Control Channel (HS-SCCH).

26. A receiving node in a wireless network, comprising:
- a transceiver;
- a processor associated with the transceiver; and
- memory containing software executable by the processor whereby the receiving node operates to:
  - receive a feedback restriction indicator from a transmitting node by being operable to receive one of two or more unused bit resources, each being indicative of one or more different restrictions on parameters to be evaluated by the receiving node for a feedback report, that corresponds to one or more desired restrictions as the feedback restriction indicator, the feedback restriction indicator being an unused bit resource in one or more instances of a control channel that is indicative of the one or more desired restrictions on the parameters to be evaluated by the receiving node for the feedback report to be provided to the transmitting node from the receiving node, the unused bit resource being a bit resource in the one or more instances of the control channel that is not used to convey one or more transmission parameters that are to be applied by the transmitting node in transmitting data to the receiving node; and
  - transmit the feedback report based on the feedback restriction indicator to the transmitting node.

* * * * *